US012579514B1

(12) United States Patent
Bernstein et al.

(10) Patent No.: US 12,579,514 B1
(45) Date of Patent: Mar. 17, 2026

(54) DIGITAL CLOSET SYSTEM WITH TRADE-IN FUNCTIONALITY

(71) Applicant: The RealReal, Inc., San Francisco, CA (US)

(72) Inventors: Nicole Eugenie Oncina Bernstein, San Francisco, CA (US); Pratik Mohan Ramdasi, Sunnyvale, CA (US); Eileen Guan, San Francisco, CA (US); Molly Elizabeth Mann, Bellevue, WA (US); Tomas Alori Sorhuet, Montevideo (UY); Federico Zaiter Trinidad, Montevideo (UY); Agostina Juliana Larrazabal, Parana (AR); Lara Yan, Alameda, CA (US); Beatrice Lynes, San Francisco, CA (US); Soledad Rivas, Montevideo (UY); Gaston Rodriguez, Montevideo (UY); Juan Pablo Gonzalez Rivero, Ciudad de la Costa (UY)

(73) Assignee: The RealReal, Inc., San Francisco, CA (US)

( * ) Notice: Subject to any disclaimer, the term of this patent is extended or adjusted under 35 U.S.C. 154(b) by 93 days.

(21) Appl. No.: 18/617,461

(22) Filed: Mar. 26, 2024

(51) Int. Cl.
　　*G06Q 10/087*　　(2023.01)
　　*G06Q 30/0201*　　(2023.01)
　　　　　　(Continued)

(52) U.S. Cl.
　　CPC ... *G06Q 10/08774* (2025.08); *G06Q 30/0206* (2013.01); *G06Q 30/06311* (2025.08); *G06V 10/82* (2022.01)

(58) Field of Classification Search
　　CPC ........... G06Q 10/087; G06Q 10/08774; G06Q 30/0206; G06Q 30/0278; G06Q 30/0283;
　　　　　　(Continued)

(56) References Cited

U.S. PATENT DOCUMENTS 9,965,794 B1 * 5/2018 Brazil ................ G06Q 30/0633
11,295,370 B1 * 4/2022 Priyadarshini ..... G06Q 30/0633
(Continued)

OTHER PUBLICATIONS

Method and system for visual guidance while capturing panoramic photograph. May 21, 2018. The IP.com Journal. IPCOM000253976D. (Year: 2018).*

(Continued)

*Primary Examiner* — William J Allen
(74) *Attorney, Agent, or Firm* — Adibi IP Group, PC; Amir V. Adibi; Andrew C. Palmer

(57) ABSTRACT

An electronic commerce platform application server comprises a digital closet application, a sell-to-buy application, and a machine learning system. The digital closet application allows users to efficiently digitize and virtually store their physical items. The digital closet application receives sensor data, such as an image or point cloud data, and detects the item and predicted sale value using a machine learning system. Digital closet items are viewed and managed via a digital closet interface, which provides images, attributes, and descriptive information of each item. The digital closet interface is dynamically updated to present marketplace insights to users based on their items and optimal sale periods based on triggers, upcoming events, and configurable thresholds. The sell-to-buy application allows a user to trade-in one or more items in exchange for credit towards a new item available on the electronic commerce platform and utilizes user interaction information to prompt trade-ins during optimal times.

16 Claims, 23 Drawing Sheets

(51) Int. Cl.
    *G06Q 30/0601*     (2023.01)
    *G06V 10/82*     (2022.01)

(58) Field of Classification Search
    CPC ... G06Q 30/0601–06444; G06V 10/82; G06V
          20/20; G06V 20/60; G06V 20/64; G06V
          20/66; G06F 3/005; G06F 3/017; G06F
                            3/048–04897
    See application file for complete search history.

(56)            References Cited

U.S. PATENT DOCUMENTS

| | | | |
|---|---|---|---|
| 2012/0239513 A1* | 9/2012 | Oliver | G06Q 30/06 |
| | | | 348/46 |
| 2017/0124635 A1* | 5/2017 | Shao | G06Q 30/0283 |
| 2022/0101413 A1* | 3/2022 | Morgan | G06Q 30/0635 |
| 2023/0102598 A1* | 3/2023 | Penner | G06N 3/006 |
| | | | 705/26.7 |
| 2023/0104294 A1* | 4/2023 | Minvielle Dabdoub | |
| | | | G06Q 30/0283 |
| | | | 705/400 |
| 2023/0260001 A1* | 8/2023 | de Juan | G06Q 30/0627 |
| | | | 705/26.63 |
| 2024/0153246 A1* | 5/2024 | Liao | G06V 10/764 |
| 2024/0242260 A1* | 7/2024 | Shanker | G06Q 30/0631 |

OTHER PUBLICATIONS

Qin et al., U2-Net: Going Deeper with Nested U-Structure for Salient Object Detection, Mar. 8, 2022, pp. 1-15.

* cited by examiner

DIGITAL CLOSET SYSTEM

DIGITAL CLOSET SYSTEM

DIGITAL CLOSET SYSTEM WITH SELL TO BUY

RECEIVING IMAGE FROM USER DEVICE

DIGITAL CLOSET INFORMATION DATA STRUCTURE

INTERACTION
INFORMATION
DATA STRUCTURE
60

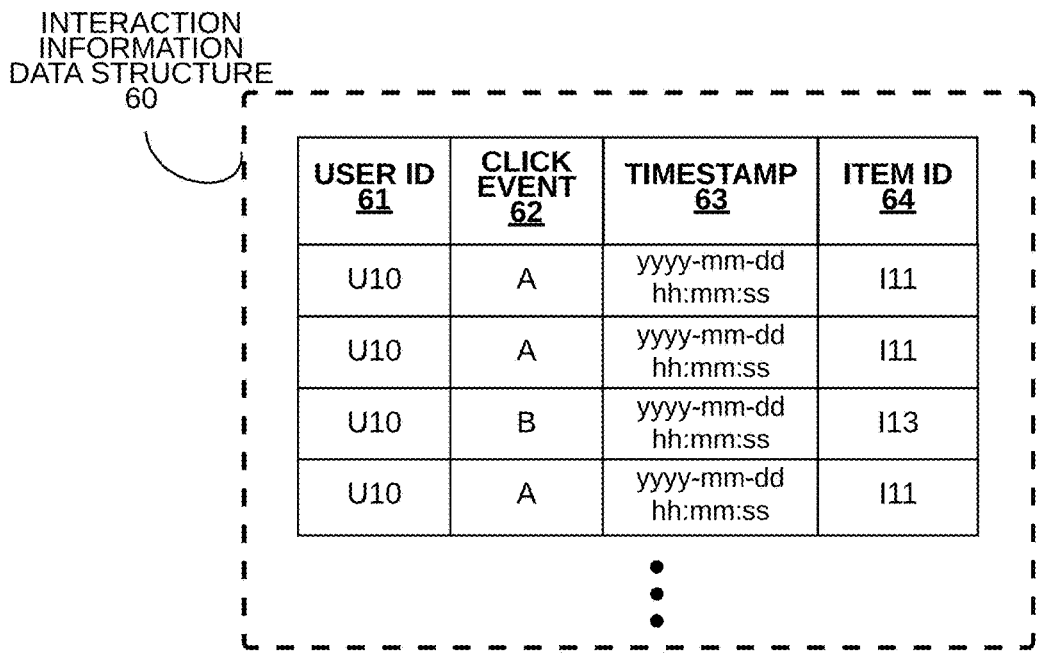

| USER ID 61 | CLICK EVENT 62 | TIMESTAMP 63 | ITEM ID 64 |
|---|---|---|---|
| U10 | A | yyyy-mm-dd hh:mm:ss | I11 |
| U10 | A | yyyy-mm-dd hh:mm:ss | I11 |
| U10 | B | yyyy-mm-dd hh:mm:ss | I13 |
| U10 | A | yyyy-mm-dd hh:mm:ss | I11 |

INTERACTION INFORMATION DATA STRUCTURE

FIG. 6

HISTORICAL
PRICE
INFORMATION
DATA STRUCTURE
70

| USER ID 71 | ITEM ID 72 | TIMESTAMP 73 | SALE PRICE 74 |
|---|---|---|---|
| U10 | I11 | yyyy-mm-dd hh:mm:ss | $100 |
| U11 | I21 | yyyy-mm-dd hh:mm:ss | $2,050 |
| U12 | I13 | yyyy-mm-dd hh:mm:ss | $800 |
| U13 | I41 | yyyy-mm-dd hh:mm:ss | $12,000 |

HISTORICAL PRICE INFORMATION DATA STRUCTURE

FIG. 7

MACHINE LEARNING SYSTEM

APPLY SEGMENTATION AND EMBEDDING MODELS

100

START

GENERATE TRAINING IMAGES — 101

LABEL TRAINING IMAGES
(TRAINING MASKS) — 102

TRAIN SEGMENTATION MODEL WITH
TRAINING DATA AND MASKS — 103

END

TRAIN SEGMENTATION MODEL

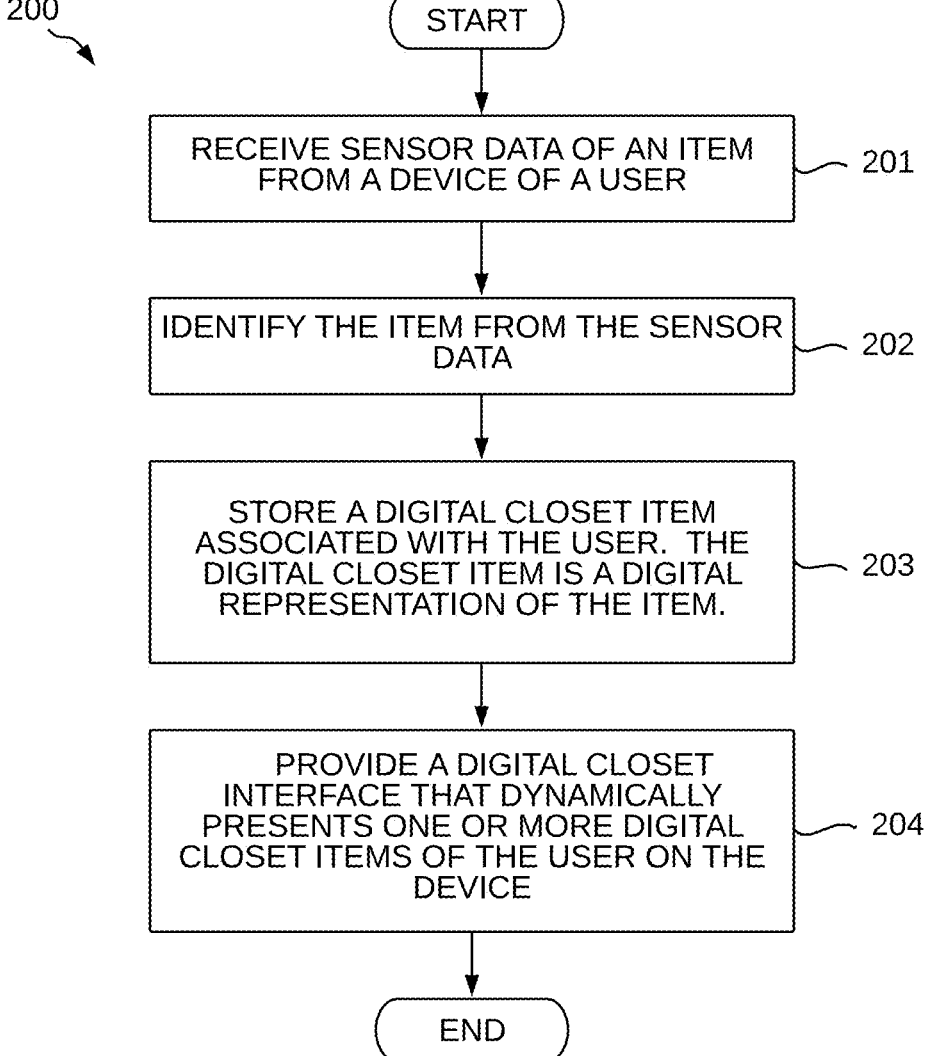

200

START

RECEIVE SENSOR DATA OF AN ITEM FROM A DEVICE OF A USER — 201

IDENTIFY THE ITEM FROM THE SENSOR DATA — 202

STORE A DIGITAL CLOSET ITEM ASSOCIATED WITH THE USER. THE DIGITAL CLOSET ITEM IS A DIGITAL REPRESENTATION OF THE ITEM. — 203

PROVIDE A DIGITAL CLOSET INTERFACE THAT DYNAMICALLY PRESENTS ONE OR MORE DIGITAL CLOSET ITEMS OF THE USER ON THE DEVICE — 204

END

OPERATION OF DIGITAL CLOSET APPLICATION

START

RECEIVE SENSOR DATA OF AN ITEM
FROM A DEVICE OF A USER — 301

PREDICT THE SALE VALUE
INFORMATION OF THE ITEM BASED ON
HISTORICAL PRICING INFORMATION OF
AN ELECTRONIC COMMERCE
PLATFORM — 302

END

PREDICTING SALE VALUE INFORMATION OF ITEM

400

PREDICTING ATTRIBUTES BASED ON STORED ITEMS

IDENTIFY AND EXTRACT ATTRIBUTES FROM
SIMILAR STORED ITEMS

600

START

PREDICT A TIME PERIOD THAT
MAXIMIZES SALE VALUE OF AN ITEM
BASED ON HISTORICAL PRICING
INFORMATION — 601

PROMPT THE USER TO SELL AN ITEM
DURING THE TIME PERIOD — 602

END

PROMPT USER TO SELL DURING OPTIMAL TIME
PERIOD

700

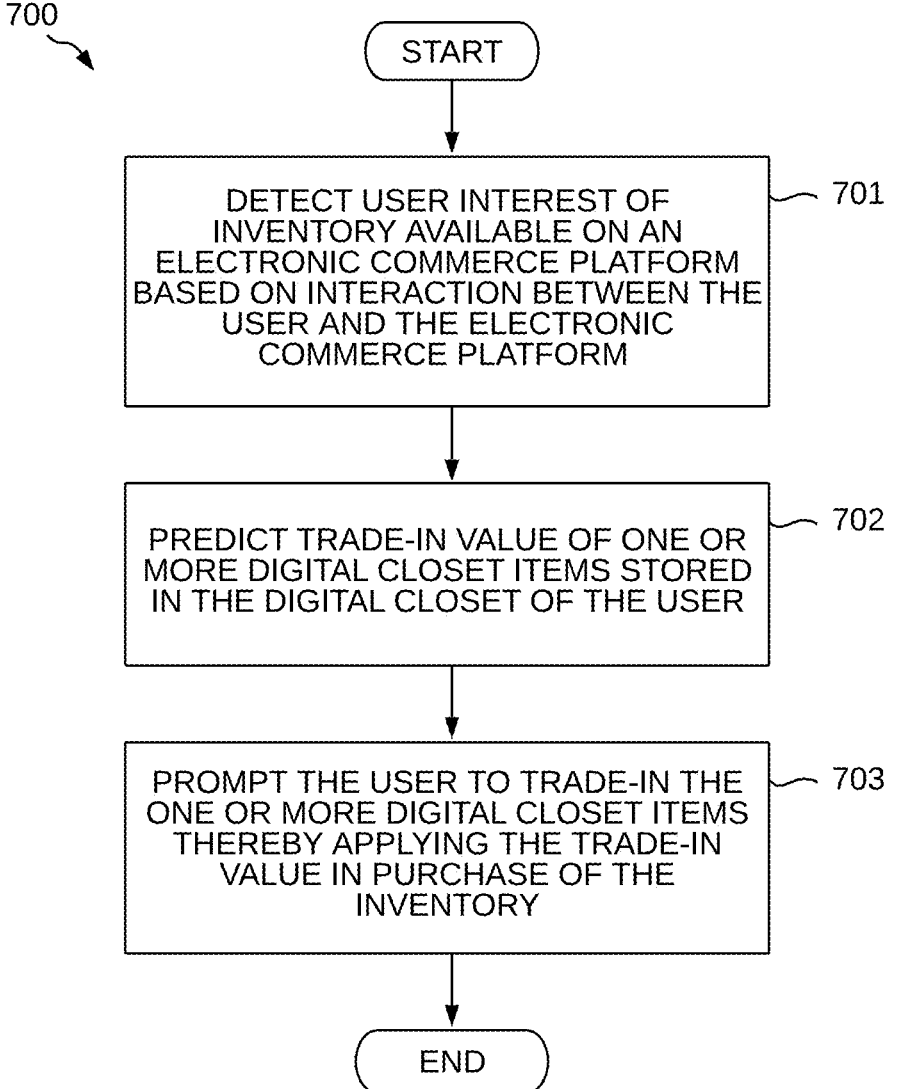

START

DETECT USER INTEREST OF INVENTORY AVAILABLE ON AN ELECTRONIC COMMERCE PLATFORM BASED ON INTERACTION BETWEEN THE USER AND THE ELECTRONIC COMMERCE PLATFORM — 701

PREDICT TRADE-IN VALUE OF ONE OR MORE DIGITAL CLOSET ITEMS STORED IN THE DIGITAL CLOSET OF THE USER — 702

PROMPT THE USER TO TRADE-IN THE ONE OR MORE DIGITAL CLOSET ITEMS THEREBY APPLYING THE TRADE-IN VALUE IN PURCHASE OF THE INVENTORY — 703

END

OPERATION OF SELL-TO-BUY APPLICATION
FIG. 16

1701

1801

1901

23

2001

2101

2201
2202

2301

2401
DIGITAL CLOSET ITEM
2402
2403
2404
2405
2406
2407

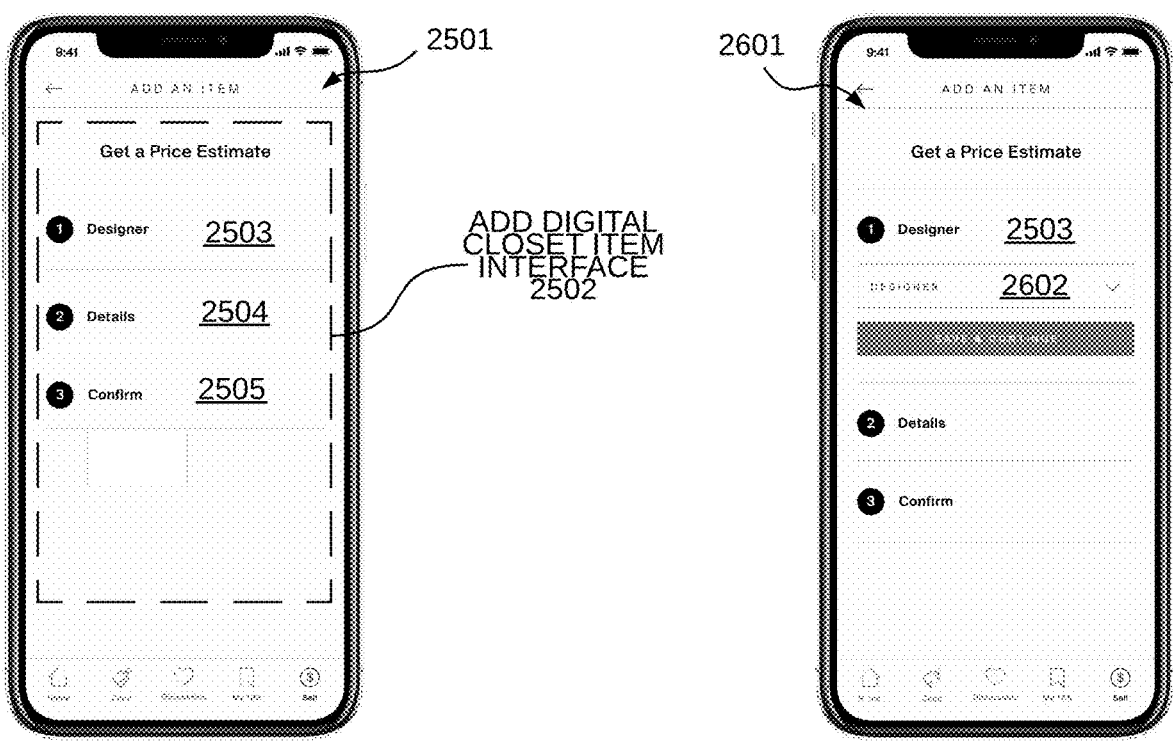
2501
ADD DIGITAL
CLOSET ITEM
INTERFACE
2502
2601
FIG. 25
FIG. 26
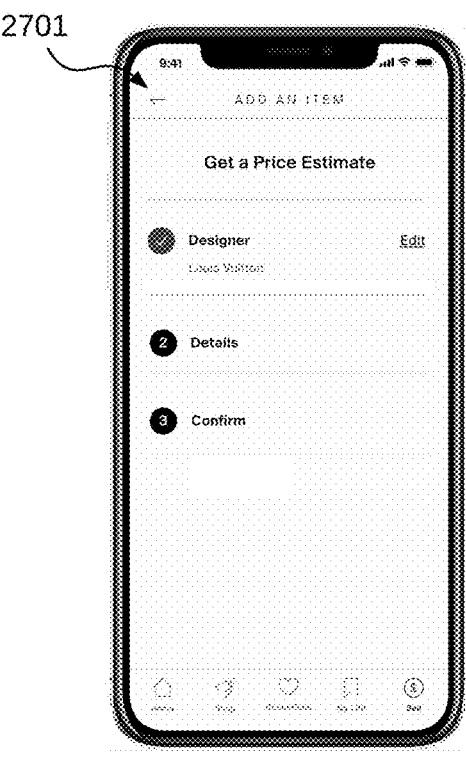
2701
FIG. 27

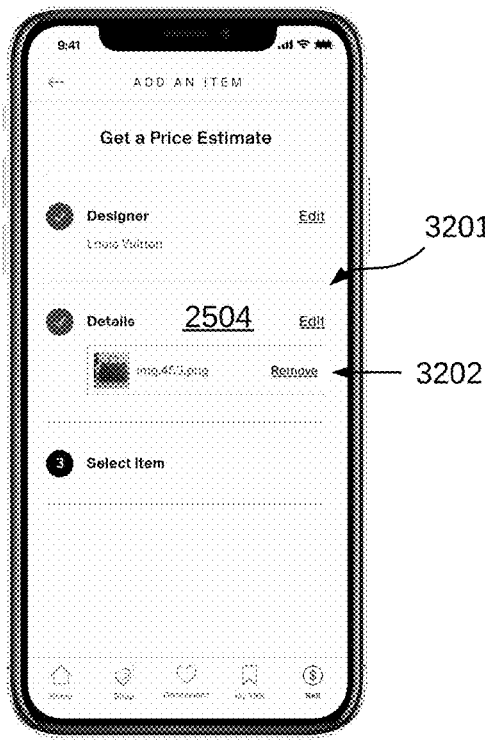

Get a Price Estimate

Designer                    Edit
Louis Vuitton

3201

Details        2504        Edit img.403.png         Remove

3202

3   Select Item

FIG.32

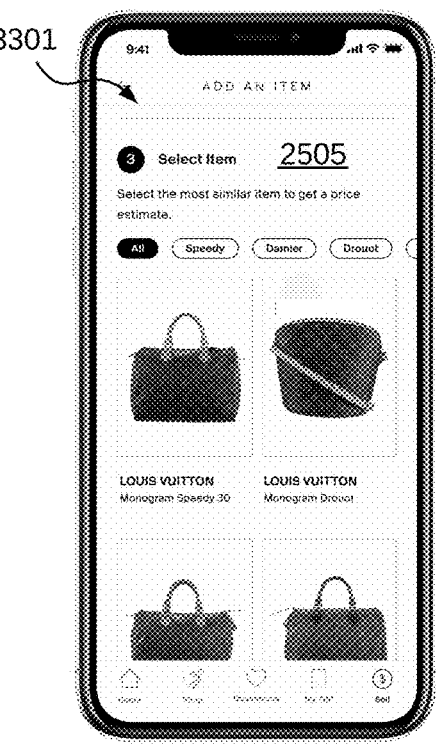

3301

3   Select Item        2505

Select the most similar item to get a price estimate.

All   Speedy   Damier   Drouot

LOUIS VUITTON        LOUIS VUITTON
Monogram Speedy 30   Monogram Drouot

FIG. 33

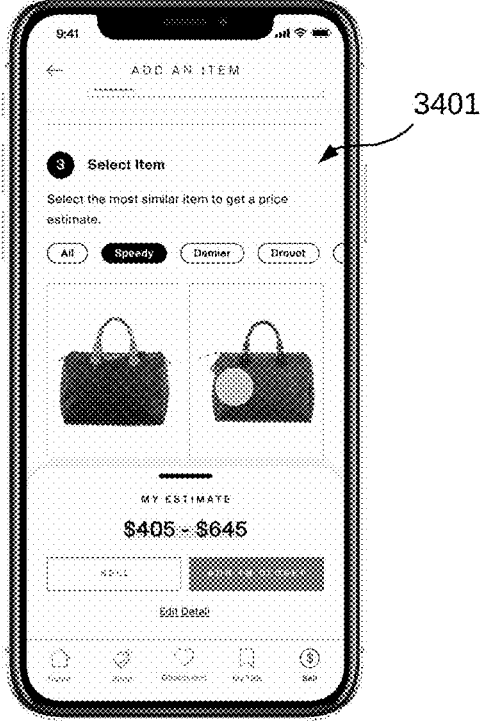

3   Select Item

3401

Select the most similar item to get a price estimate.

All   Speedy   Damier   Drouot

MY ESTIMATE $405 - $645

Edit Detail

FIG. 34

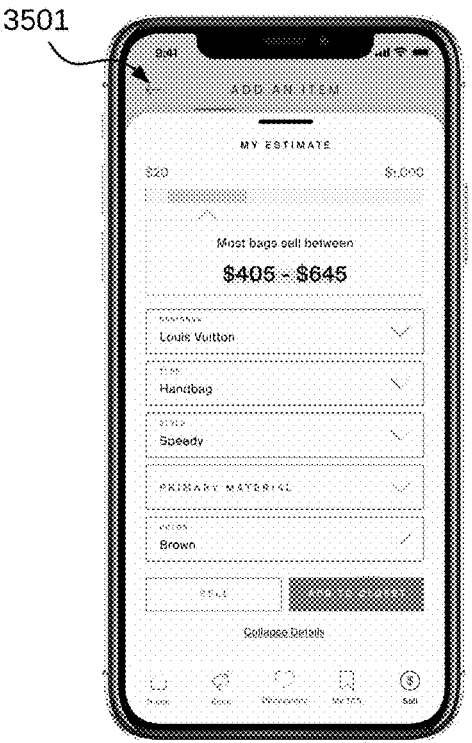

3501

MY ESTIMATE $20                        $1,000

Most bags sell between $405 - $645

Louis Vuitton

Handbag

Speedy

PRIMARY MATERIAL

Brown

Collapse Details

DIGITAL CLOSET SYSTEM WITH TRADE-IN FUNCTIONALITY

TECHNICAL FIELD

The present invention relates generally to online commerce systems, and more specifically, to virtual representations of items.

BACKGROUND INFORMATION

Large retail providers often offer many types of items for sale and carry a significant variety of inventory. Retail providers typically sell items using online commerce platforms. These online commerce platforms provide customers with the functionality to purchase items from retailers through websites or through mobile applications. The customer accesses online commerce platforms via their desktop or mobile internet browsers or via a mobile application downloaded and installed on their mobile device. After selecting an item of interest to view, the customer is presented with a Product Description Page (PDP). The PDP provides the customer with information in connection with the selected item of interest, including price information and a description of the item. The customer is able to purchase the selected item via the PDP.

SUMMARY

An electronic commerce platform application server comprises a digital closet application, a sell-to-buy application, and a machine learning system. The digital closet application allows users to efficiently digitize and virtually store their physical items. The digital closet application receives sensor data. The sensor data is collected using image sensors, such as high-resolution cameras having at least twelve-megapixel resolution, and remote sensing devices, such as Light Detection and Ranging (LiDAR) sensors. The machine learning system detects the item and predicted sale value from the sensor data.

A digital closet item is generated for the item added to the digital closet. The digital closet item includes one or more images of the item, one or more attributes describing the item, and a predicted sale value. The digital closet items are viewed and managed via a digital closet interface provided on the device. The digital closet interface is dynamically updated to present marketplace insights to users based on their items and optimal sale periods based on triggers, upcoming events, and configurable thresholds.

The sale-to-buy application allows a user to trade-in one or more items in exchange for credit towards a new item available on the electronic commerce platform. The sell-to-buy application utilizes user interaction information to prompt trade-ins during optimal times. The user interaction information includes clickstream data that monitors user behavior and interaction with items available on the electronic commerce platform. For example, if the electronic commerce platform system detects user interest for a particular item, the sell-to-buy application notifies the user of possible items in their virtual closet that they can trade-in to purchase the item of interest. The sell-to-buy application further leverages marketplace insights to time the exchange that optimizes the trade-in value of their items. In addition, the sell-to-buy application provides a single-click interface element that triggers return label generation for trade-in items and purchase transaction of the new item. If the trade-in items do not cover the price of the acquired item, then a default payment source is charged.

The novel digital closet application and sell-to-buy application provide improved functionality unavailable in other commercially available image based product recognition tools and price estimators. The digital closet application provides an easy to use interface that is presented on a single screen, on mobile, desktop, in-store kiosk, or virtual VR headset, that shows all virtual items of the user. The digital closet application provides improved attribute detection by leveraging machine learning and existing item information to accurately and efficiently detect attributes of items being added to the virtual closet. The user is able to trade-in or sell items via single click via the electronic commerce platform that generates appropriate shipping labels. In addition, the digital closet application leverages marketplace insights allowing the user to configure notifications for sell or trade-in of their items during times that optimize resale value.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 shows an interaction information data structure in accordance with one embodiment.

FIG. 7 shows a historical price information data structure in accordance with one embodiment.

FIG. 11 shows a diagram of a method of operation provided by a digital closet application.

FIG. 16 shows a diagram of a method illustrating operation of a sell-to-buy application in accordance with one embodiment.

FIGS. 17-44 are diagrams showing views of the digital closet user interface provided on a user device.

DETAILED DESCRIPTION

Reference will now be made in detail to some embodiments of the invention, examples of which are illustrated in the accompanying drawings.

Figure 1:
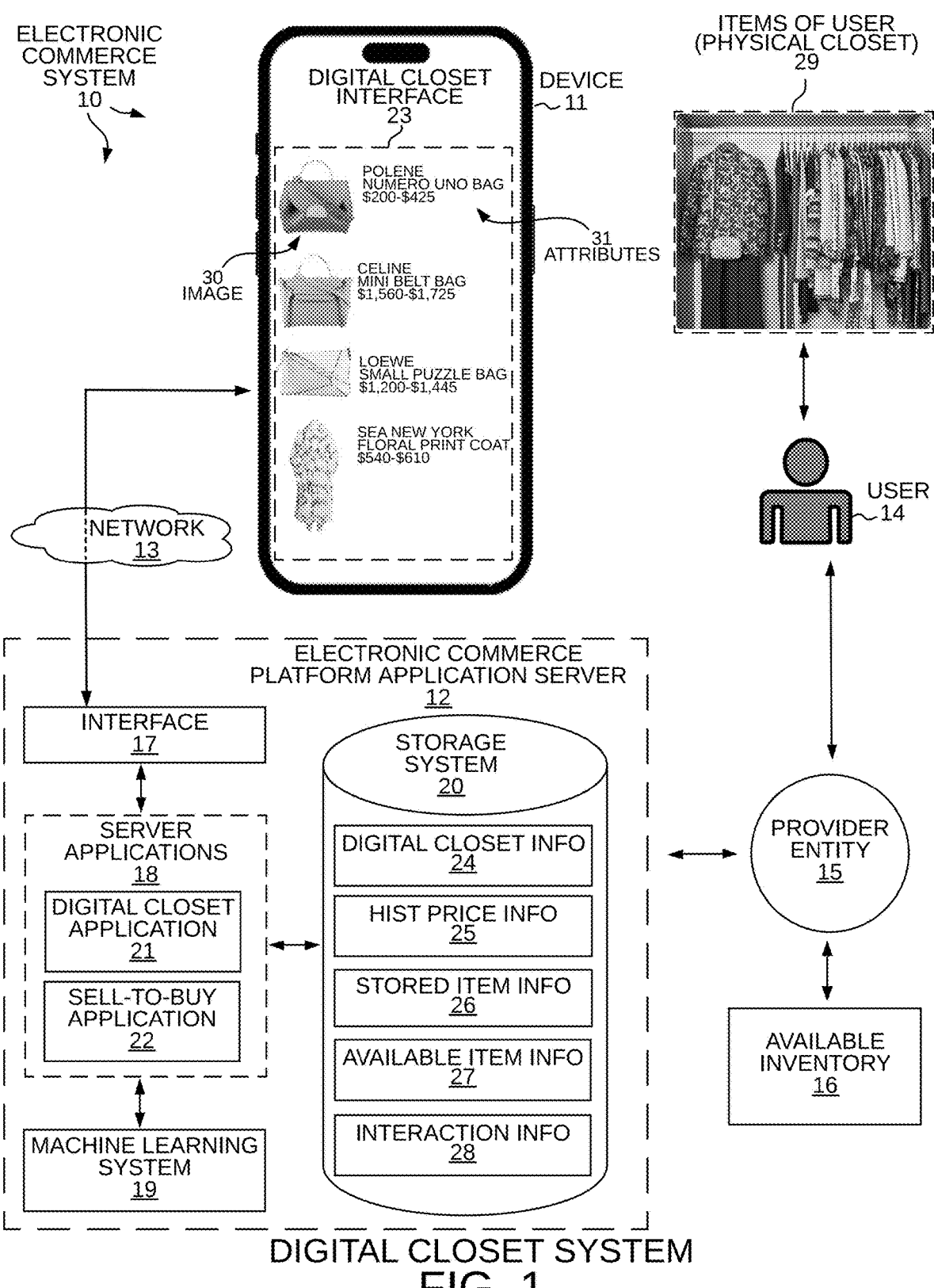
FIG. 1 is a diagram of an electronic commerce system 10 in accordance with one embodiment.

FIG. 1 is a diagram of an electronic commerce system 10 in accordance with one embodiment. The electronic commerce system 10 includes a user device 11 and an electronic commerce platform application server 12. The user device 11 communicates with the application server 12 over a network 13. The application server 12 provides an electronic commerce platform that allows a user 14 to view and purchase items provided by a provider entity 15.

The user device 11 is a mobile device, tablet, desktop computer, VR/AR headset, virtual assistant device, or any other network-enabled device suitable to access the electronic commerce platform. The provider entity 15 is an entity that manages and sells available inventory 16, such as an online retailer or online consignor. The user 14 views one or more items in available inventory 16 presented on product detail pages (not shown) accessible via the user device 11. The product detail pages are presented via a mobile application or internet browser operating on the user device 11.

The application server 12 comprises an interface 17, one or more server applications 18, a machine learning system 19, and a storage system 20. The application server 12 includes additional components and hardware (not shown) that provide product detail pages and allow provider entity 15 to manage inventory 16 and other functionality associated with offering items for sale. In one embodiment, components of the application server 12 operate across a distributed network. For example, server applications 18 are realized as a Compute Engine virtual machine operating on Google® Cloud infrastructure and part of the storage system 20 is realized as an Elasticsearch Service operating on the Google® Cloud infrastructure. The interface 17 comprises any suitable hardware/software capable of interfacing with external devices, such as a network link or a physical communication bus that allows wired or wireless communications between external devices and the application server 12.

Figure 3:
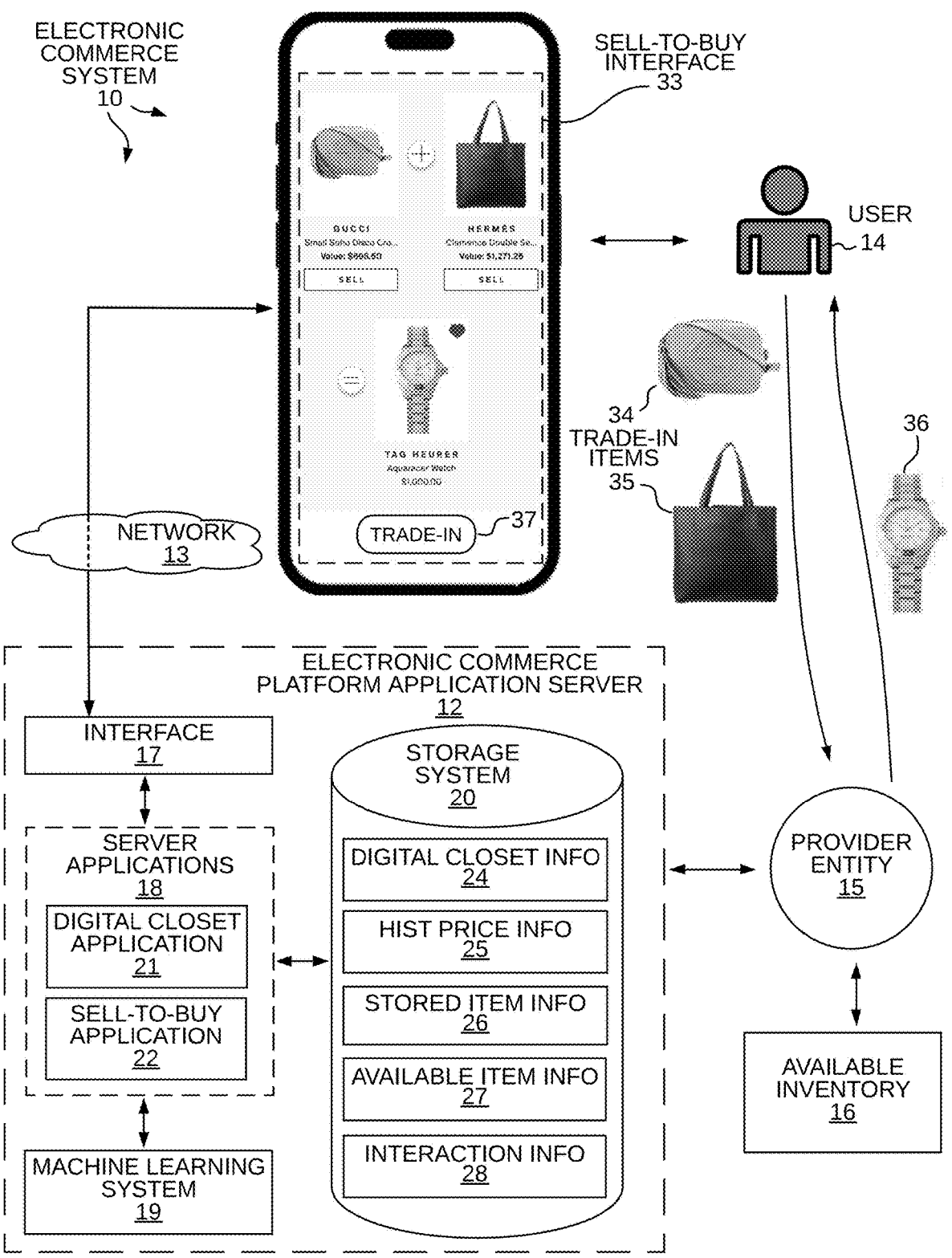
FIG. 3 is a diagram showing how a user is able to trade-in various items in obtaining new items from a provider entity.

In this embodiment, the one or more server applications 18 include a digital closet application 21 and a sell-to-buy application 22. The digital closet application 21 provides digital closet features in the electronic commerce system 10. The digital closet application 21 provides a digital closet interface 23 rendered on device 11 of the user 14. The sell-to-buy application 22 allows the user 14 to trade-in items using a sell-to-buy interface 33 as shown in FIG. 3.

The storage system 20 is any suitable hardware that stores computer readable information accessible via server applications 18. The storage system 20 includes one or more different types of databases, including relational database systems and document-oriented database systems. The storage system 20 stores information involved in operation of server applications 18 in addition to other information involved in operation of the electronic commerce system 10. The storage system 20 stores digital closet information 24, historical price information 25, stored item information 26, available item information 27, and interaction information 28.

The digital closet information 24 includes all information involved in rendering and providing digital closet interface 23 for various users of the electronic commerce system 10. The digital closet information 24 includes images, predicted sales price, and attributes of digital closet items. The historical price information 25 includes all sales-related information collected by the provider entity 15, including sales price of each item sold, price historical price changes of items, and return information of items. The server applications 18 use the historical price information 25 to predict sale prices of digital closet items. The stored item information 26 includes attributes of items, such as brand/source, material, hardware, color, pattern, size, taxon/type, and other descriptive item information of current and past inventory. The server applications 18 use stored item information 26 to predict attributes of items added via the digital closet interface 23. The available item information 27 includes information related to available inventory 16, including images, sales price, and attributes of available inventory 16 offered for sale by provider entity 15. The interaction information 28 stores all navigation information of users of the electronic commerce platform, including which product detail pages were viewed and the order the product detail pages were viewed for each user. The sell-to-buy application 22 uses the interaction information 28 to predict items of interest to the user 14 and to trade-in digital closet items for items of interest.

During operation of the digital closet application 21, the user 14 stores digital versions of their items, including clothing and apparel, on the digital closet interface 23. Items of a user 29 stored in a physical closet are able to be digitized and stored virtually. The user 14 is able to view and manage their items on the digital closet interface 23. Each digital closet item includes one or more images 30 and one or more attributes 31. The digital closet interface 23 dynamically updates to present marketplace insights to users based on their items, including sales price estimates of items, recommendations on when to sell or consign items that maximize sales price, and notifications that trigger when items are in demand or within a desired sales range configured by the user 14.

During operation of the sell-to-buy application 22, the user 14 is able to trade-in one or more items in exchange for credit towards a new item available on the electronic commerce platform 12. The sell-to-buy application 22 utilizes user interaction information 28 to prompt trade-ins during optimal times. The user interaction information 28 includes, for example, clickstream data that indicates user behavior and interaction with available inventory 16 on the electronic commerce platform 12. For example, if the electronic commerce platform system 12 detects user interest for a particular item, the sell-to-buy application 22 notifies the user 14 of possible items in their digital closet interface 23 that they can trade-in to purchase the item of interest. The sell-to-buy application 22 further leverages marketplace insights to time the exchange that optimizes the trade-in value of their items.

Figure 2:
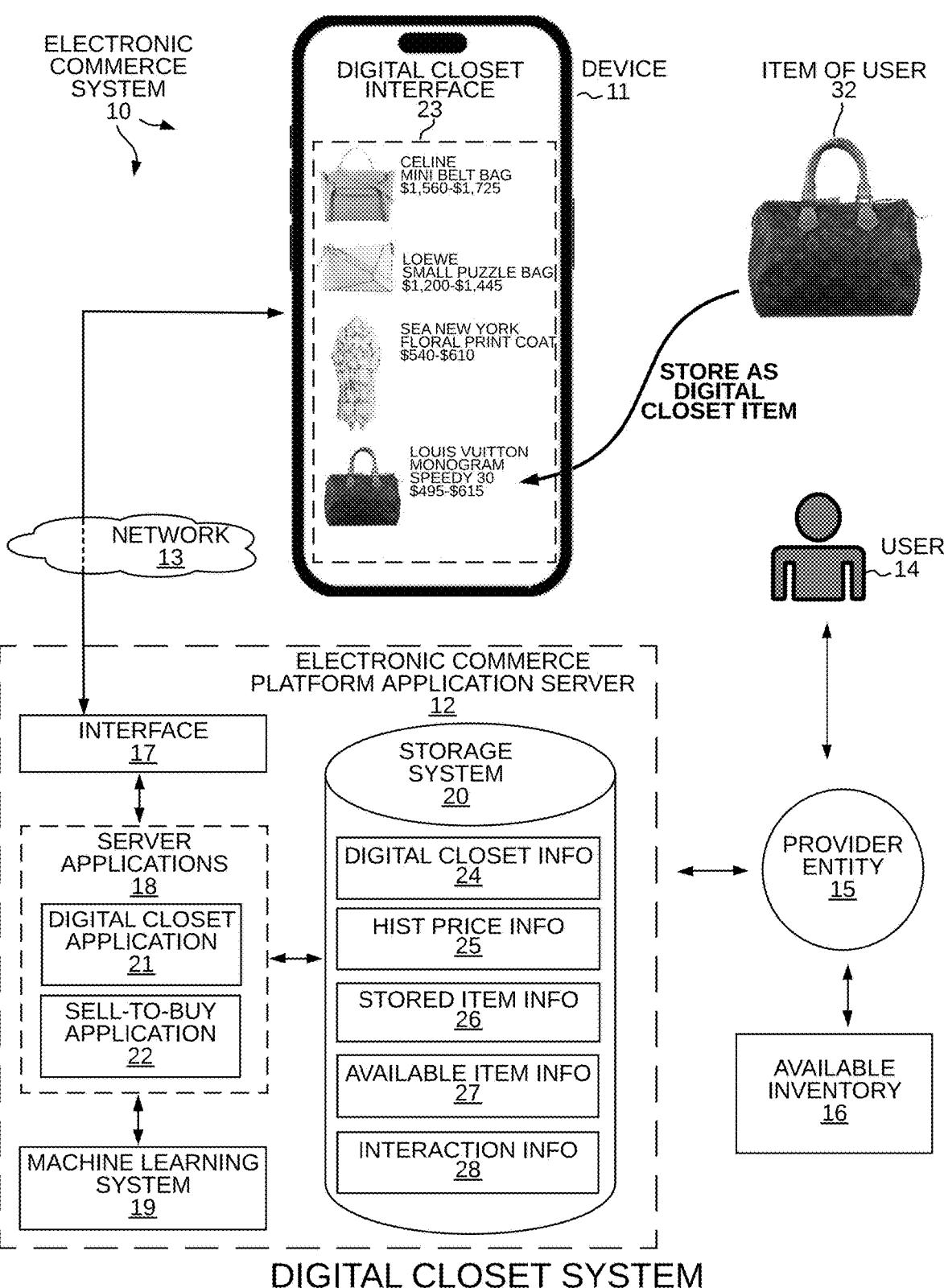
FIG. 2 is a diagram showing how an item of a user is added onto a digital closet interface.

FIG. 2 is a diagram showing how an item 32 of the user 14 is added onto the digital closet interface 23. The digital closet application 21 provides the digital closet interface 23 on the device 11 of the user. The digital closet interface 23 provides various user interface elements that allow the user to obtain an image of the item and to add the physical item 32 to the digital closet of the user 14. After being added, the physical item 32 is stored as a digital closet item and is accessible via the digital closet interface 23.

FIG. 3 is a diagram showing how a user is able to trade-in various items in obtaining new items from provider entity 15. The sell-to-buy application 22 provides a sell-to-buy interface 33. In this example, user 14 uses the sell-to-buy interface 33 to trade-in items 34 and 35 in obtaining a new item 36 from provider entity 15. The user 14 initiates this transaction via a user interface element 37 ("TRADE-IN"

button) on the sell-to-buy interface 33 provided by the sell-to-buy application 22. In response, the sell-to-buy application 22 initiates a shipment process for trade-in items 34 and 35 and new item 36.

In accordance with at least one novel aspect, the sell-to-buy application 22 provides a single-click interface element 37 that triggers return label generation for trade-in items 34 and 35 and purchase transaction of the new item 36. If the trade-in items 34 and 35 do not cover the price of the acquired item 36, then a default payment source is charged.

Figure 4:
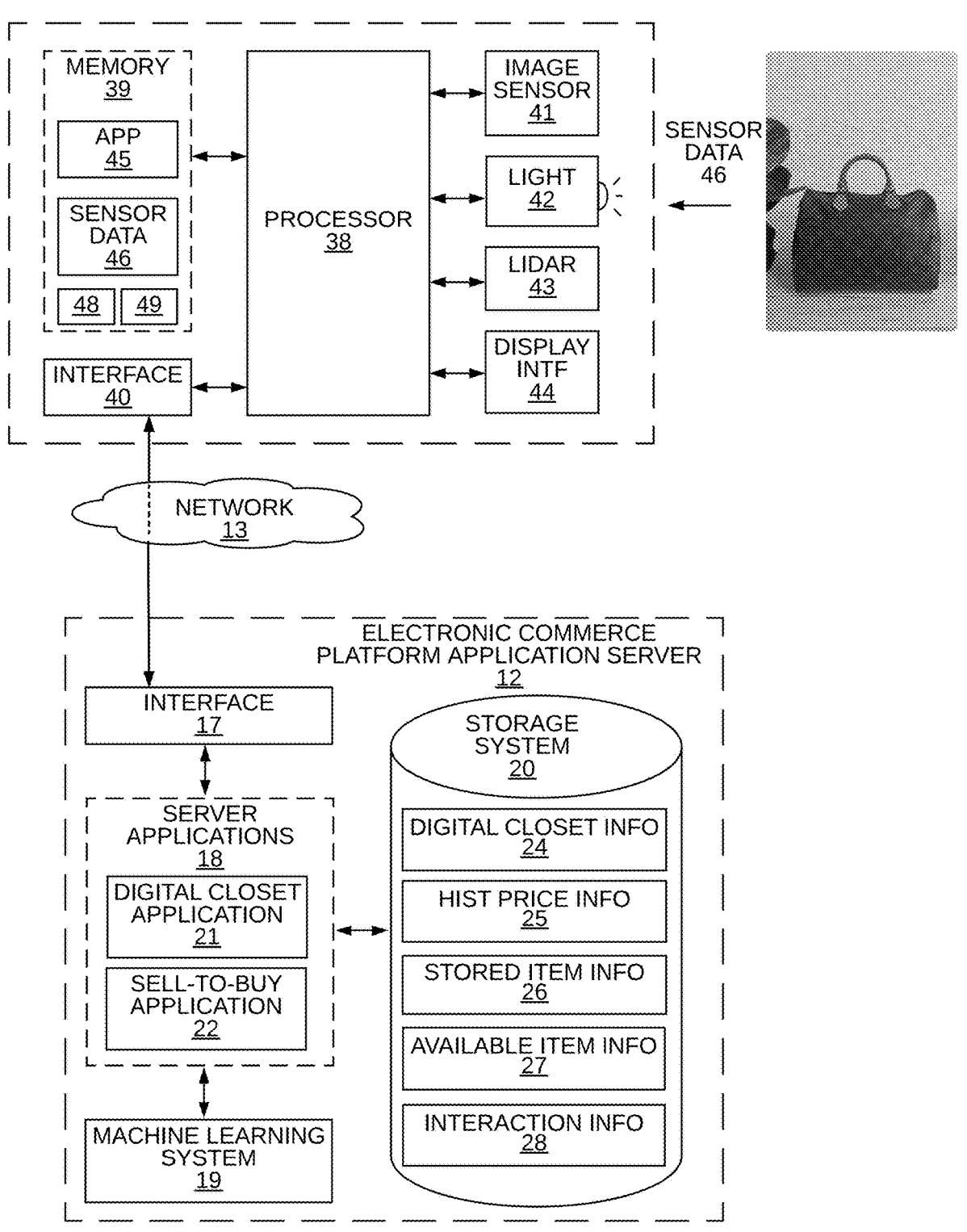
FIG. 4. is a detailed diagram of a device in accordance with one embodiment.

FIG. 4. is a detailed diagram of device 11 in accordance with one embodiment. The device 11 comprises a processor 38, a memory 39, a network interface 40, an image sensor 41, a light 42, a remote sensing device 43 (such as a LiDAR device), and a display interface 44. The device 11 includes other hardware and software components not shown to simplify explanation. Memory 39 is a computer-readable medium that includes any kind of computer memory such as floppy disks, conventional hard disks, CD-ROMS, Flash ROMS, non-volatile ROM, RAM, and non-volatile memory. The interface 40 comprises any suitable hardware/software capable of interfacing with external devices, such as a network link or a physical communication bus that allows wired or wireless communications between external devices and the application server 12.

During operation, the processor 38 runs an application 45 stored in memory 39. The application 45 includes computer readable instructions, such as a mobile application or web browser that is configured to communicate with application server 12. The application 45 causes the processor 38 to control image sensor 41 and remote sensing device 43 to capture sensor data 46 and controls the light 42 to provide desired lighting. The sensor data 46 includes images obtained via the image sensor 41 and remote sensing information obtained via the remote sensor 43. The processor 38 communicates the sensor data 46 to the server applications 18 on application server 12 via the interfaces 40 and 17.

The memory 39 stores additional information relevant to assist user 14 in selling or exchanging items in their digital closet. For example, the memory 39 stores threshold or trigger information 48. The threshold or trigger information 48 operates as a limit order in which the user 14 indicates that when a digital closet item has a predicted sale value within a configurable range, then the user 14 is notified to sell the item or trade-in the item using the sell-to-buy application 22. In another embodiment, the threshold or trigger information 48 triggers a notification when an item is outside of or near boundaries of a configurable range thereby triggering an exchange.

The memory 39 also stores information about upcoming events 49 that are used to prompt the user to purchase or acquire new items using their existing digital closet items as trade-in currency. For additional information on upcoming event information 49, including how to detect upcoming events and predict items matching upcoming events, see: U.S. patent application Ser. No. 18/384,819, "Generating Personalized Item Recommendations Based On Event Information," filed on Oct. 27, 2023, by Brossman et al. (the entire subject matter of the foregoing patent document is hereby expressly incorporated by reference).

Figure 5:
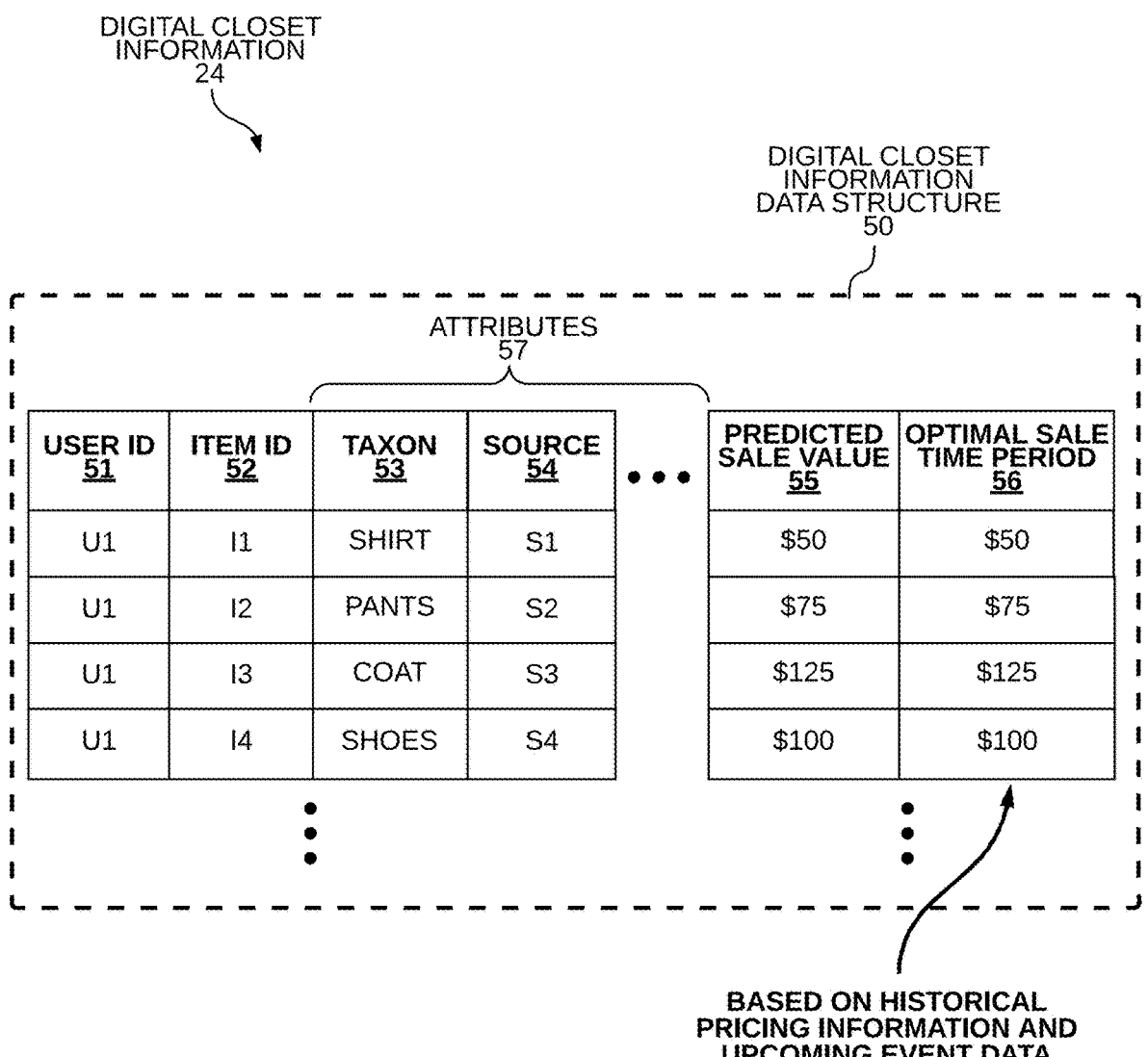
FIG. 5 is a diagram of digital closet information stored in a digital closet data structure.

FIG. 5 is a diagram of a digital closet information 24 stored in a digital closet data structure 50. The digital closet data structure 50 includes user identifier (ID) information 51, item identifier (ID) information 52, taxon/type information 53, source/brand information 54, predicted sale value information 55, and optimal sale time period information 56. Other attributes 57 that describe digital closet items are optionally stored in the digital closet information data structure 50. Such attributes 57 are obtained by comparing detected items to stored items, by user input, by machine learning algorithms that predict attributes based on images and/or sensor data, or by combination of stored item comparison, user input, and machine learning techniques.

FIG. 6 shows an interaction information data structure 60 in accordance with one embodiment. The structure 60 includes a user identifier (ID) 61, click event 62, timestamp 63, and item identifier 64.

FIG. 7 shows a historical price information data structure 70 in accordance with one embodiment. The structure 70 includes a user identifier (ID) 71, item identifier (ID) 72, timestamp 73, and sale prices 74.

Figure 8:
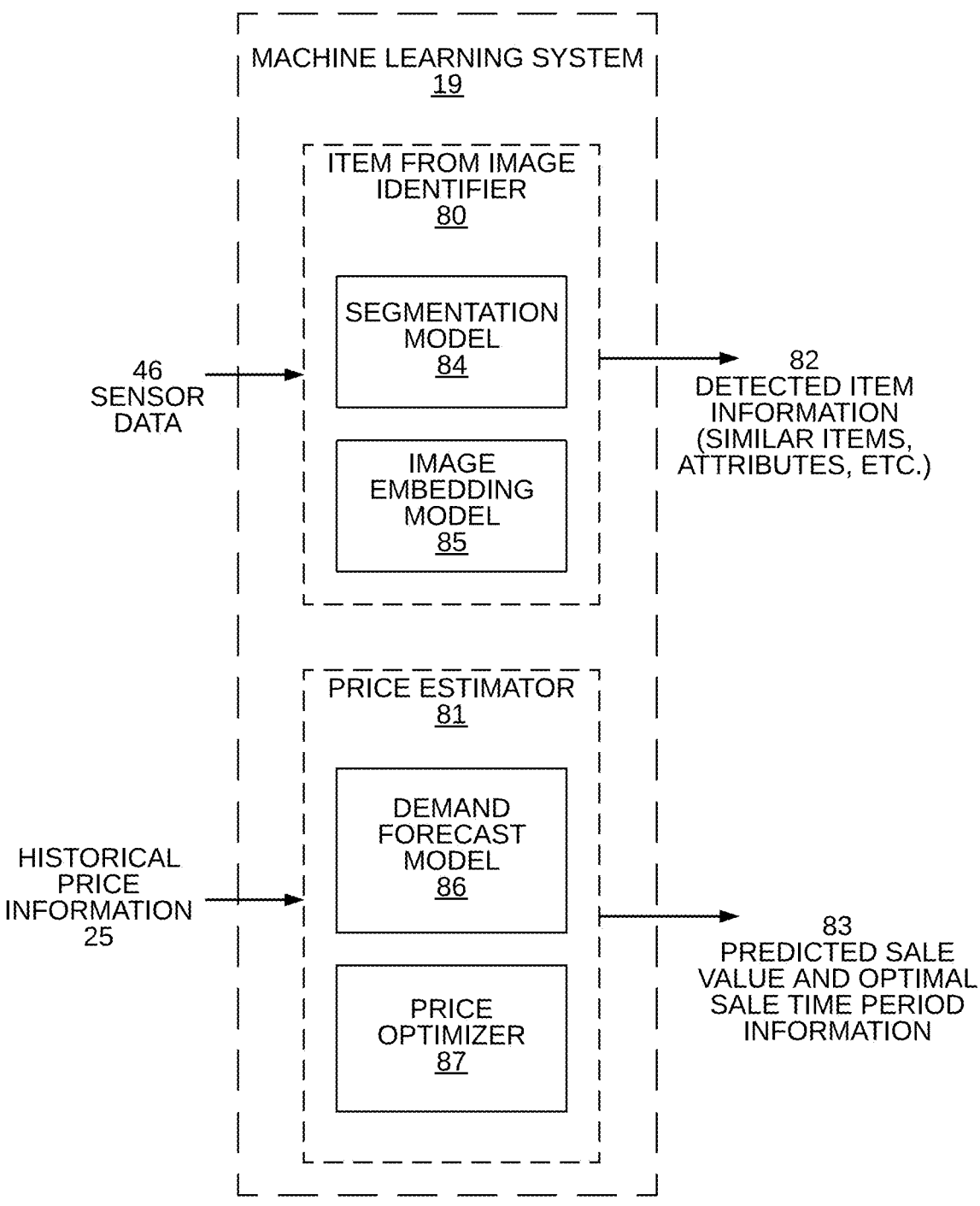
FIG. 8 is a detailed diagram of a machine learning system used to detect items in images.

FIG. 8 is a detailed diagram of the machine learning system 19 used to detect items in images. The machine learning system includes a segmentation model 84. The segmentation model 84 generates a mask 90 that is used to isolate an item in an image in accordance with one embodiment.

Figure 9:
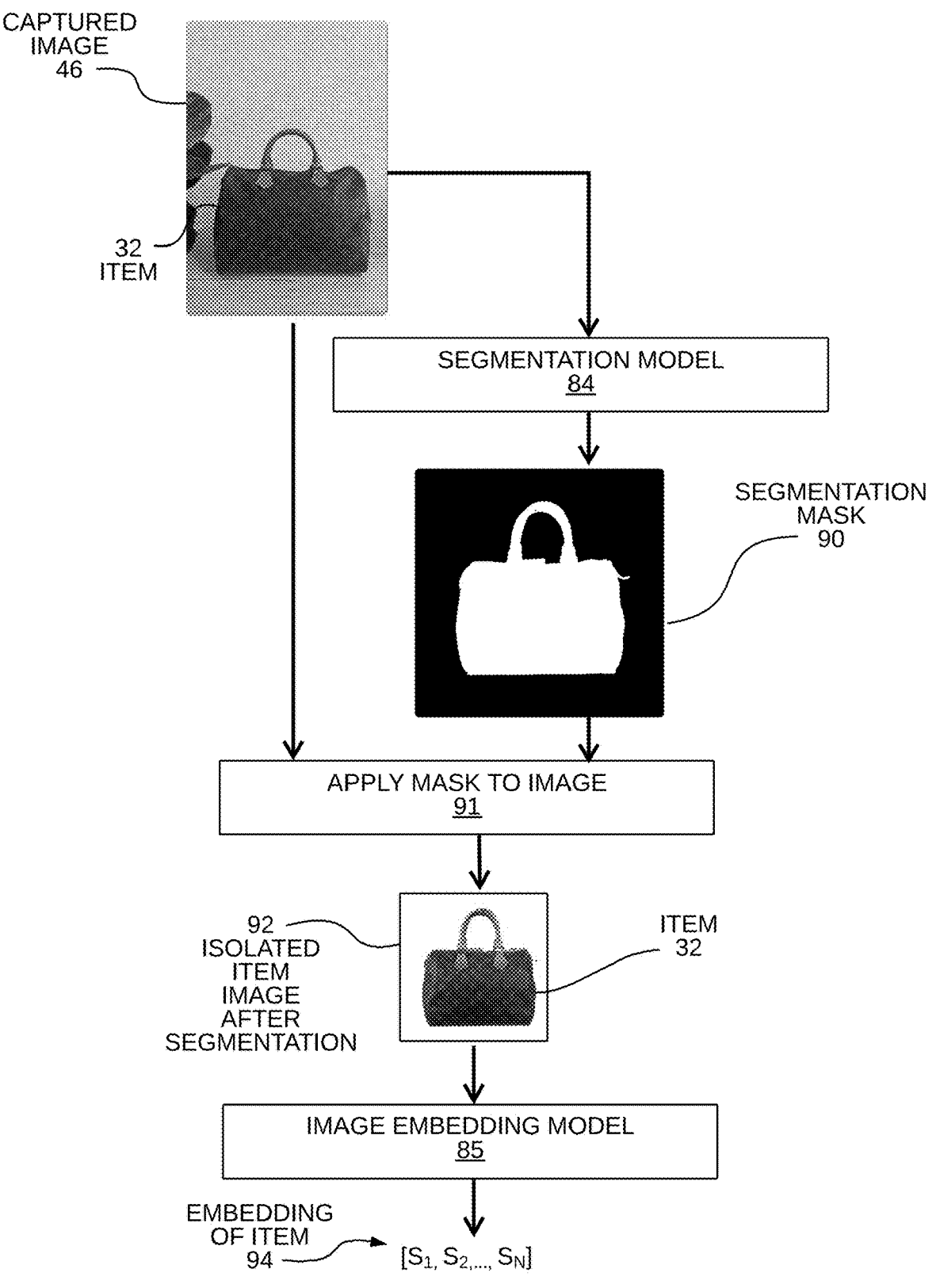
FIG. 9 illustrates how segmentation and embedding models are applied in accordance with one embodiment.

FIG. 9 shows a diagram illustrating the application of segmentation and embedding models to a captured image. During operation, a user captures an image 46 of an item 32 (e.g., a bag). The image 46 is processed by the segmentation model 84, which generates a segmentation mask 90. At block 91, the mask 90 is applied to the image 46 to generate an isolated image 92 of the item 32 after the segmentation process is complete. The isolated image 92 shows only item 32 with the background and extraneous features removed. The isolated image 92 is then processed by an image embedding model 85 to generate an embedding 94 that is used to search for similar items as described herein.

An isolated image 92 comprising the item 32 is processed by the image embedding model 85. The image embedding model 85 generates an embedding 94 that uniquely encodes the item image 92. The generated embedding 94 is then used to perform a search of available inventory to find items having the same or similar embedding. Similar items in the stored item information 27 are used to identify attributes and sales price information of the new item being added to the digital closet.

Figure 10:
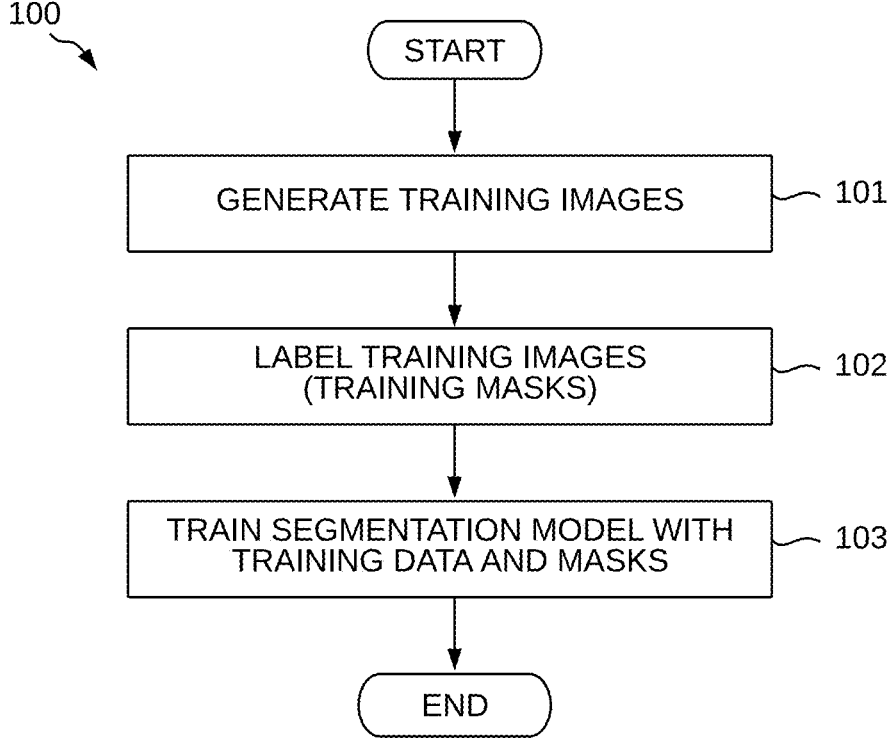
FIG. 10 is a flowchart of a method for training a segmentation model using training images in accordance with one embodiment.

FIG. 10 is a flowchart of a method 100 for training a segmentation model using training images in accordance with one embodiment. In a first step (Step 101), training images are generated. For example, the segmentation model 84 shown in FIG. 8 is trained using training data. Image augmentation techniques are optionally employed to increase training data supplied to the segmentation model. For example, training images are rotated to programmatically obtain additional images from a base set of images.

In a second step (Step 102), training images are labeled. Labels, such as masks, are generated for each training image. For example, for each training image, a binary image is generated identifying a target (such as an item) with white pixels and background (such as background items) with black pixels. These binary mask images represent desired output from the segmentation model and are used to train the model.

In a third step (Step 103), the segmentation model is trained using training images and training masks. Dice score metrics are used to improve accuracy of the segmentation model. The segmentation model involves a U-Net-type convolutional neural network that employs a BCEWithLogitsLoss type of loss function. In another embodiment, the segmentation model is an unsupervised segmentation model.

It is appreciated that other implementations involving different types of computer vision and image processing techniques, including non-machine learning-based methodologies can be utilized. For additional information on how to train and implement artificial intelligence models that identify items and item features in image data and/or remote sensing data, see: (1) U.S. patent application Ser. No. 18/512,006, entitled "System For Personalized User Measurements And Sizing Of Items," filed on Nov. 16, 2023, by Cheema et al., (2) U.S. patent application Ser. No. 18/240,590, "Automated Authentication System For Production Environments," filed on Aug. 31, 2023, by Dombrowski et al., and (3) U.S. patent application Ser. No. 18/441,266, "Image Based Real-Time Inventory Search System," filed on Feb. 14, 2024, by Cheema et al. (the entire subject matter of each of the foregoing patent documents is hereby expressly incorporated by reference).

FIG. 11 shows a diagram of a method 200 of operation provided by a digital closet application. For example, in one embodiment, the operations of method 200 are performed by the digital closet application 21 shown in FIG. 1.

In a first step (Step 201), sensor data of an item is received from a device of a user. For example, the user 14 controls the device 11 to capture an image of the item and to transmit the image to the platform application server 12.

In a second step (Step 202), the item is identified from the sensor data. In one embodiment, the machine learning system 19 performs the segmentation model 84 and the image embedding model to identify the item in the image.

In a third step (Step 203), a digital closet item associated with the user is stored. The digital closet item is a digital representation of the item.

In a fourth step (Step 204), a digital closet interface dynamically presents one or more digital closet items of the user on the device.

Figure 12:
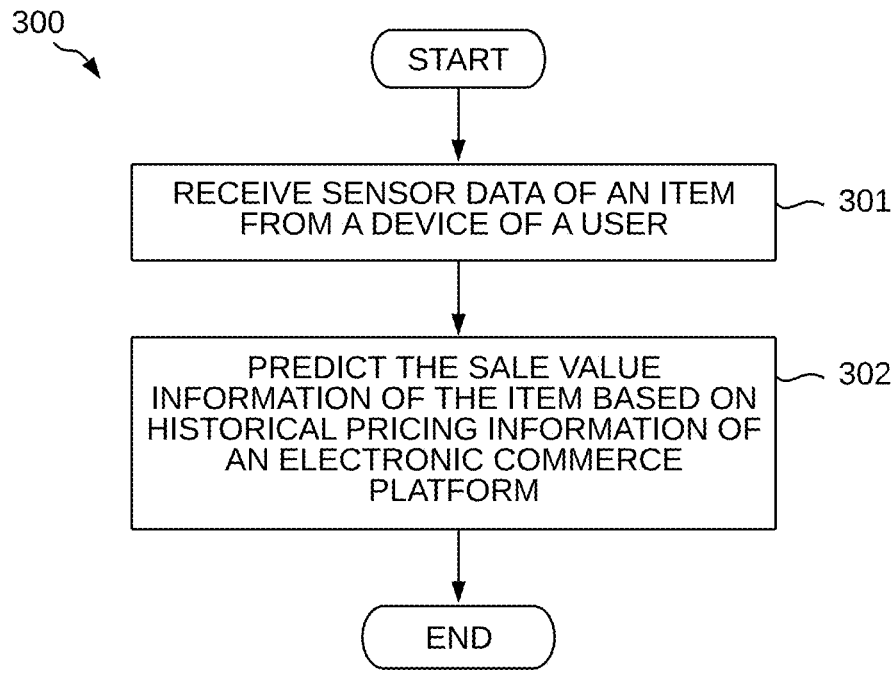
FIG. 12 shows a diagram of a method for predicting sale value information of an item.

FIG. 12 shows a diagram of a method 300 for predicting sale value information of an item. In one embodiment, method 300 is performed by the electronic commerce platform application server 12 running the digital closet application 21.

In a first step (Step 301), sensor data of an item is received from a device of a user.

In a second step (Step 302), the sale value information is predicted based on historical pricing information of an electronic commerce platform. For example, the historical price information 25 is used to determine the sale value information.

Figure 13:
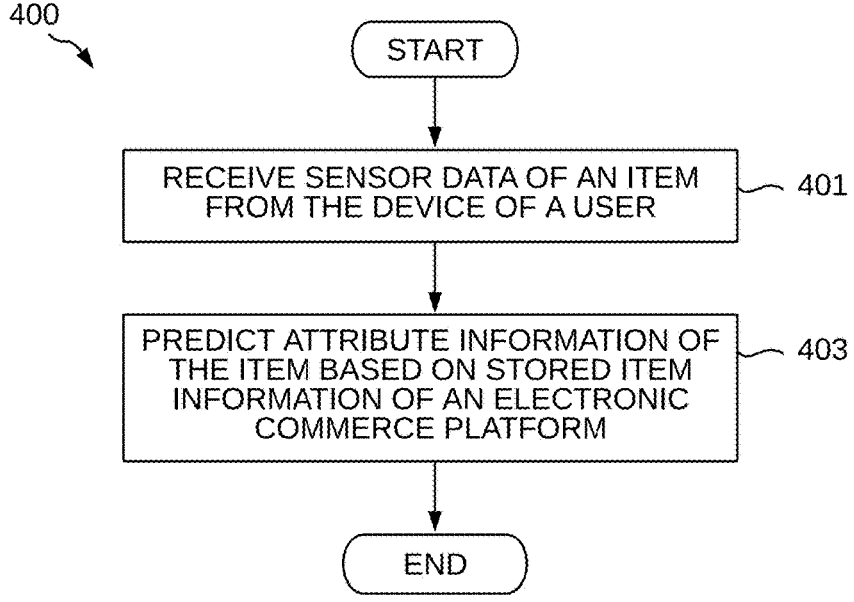
FIG. 13 shows a diagram of a method for predicting attributes based on stored items.

FIG. 13 shows a diagram of a method 400 for predicting attributes based on stored items. In one embodiment, method 400 is performed by the electronic commerce platform application server 12 running the digital closet application 21.

In a first step (Step 401), sensor data of an item is received from a device of a user.

In a second step (Step 402), attribute information of an item is predicted based on stored item information of an electronic commerce platform.

Figure 14:
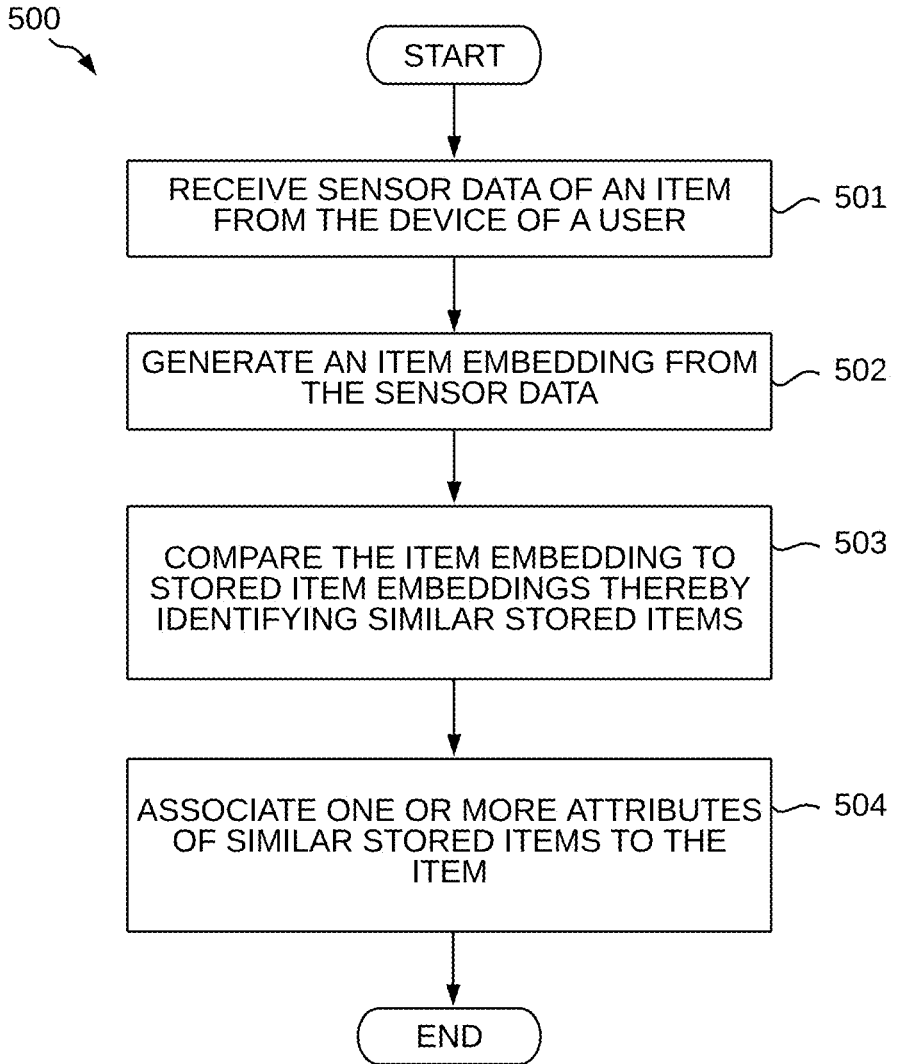
FIG. 14 shows a diagram of a method for identifying and extracting attributes from stored items.

FIG. 14 shows a diagram of a method 500 for identifying and extracting attributes from stored items. In one embodiment, method 500 is performed by the electronic commerce platform application server 12 running the digital closet application 21.

In a first step (Step 501), sensor data of an item is received from a device of a user. For example, the sensor data is an image, point cloud, or other sensor-derived representations suitable for generating an embedding of the item and for downstream attribute prediction.

In a second step (Step 502), an item embedding is generated from the sensor data of the item received from the device of the user. In some embodiments, an embedding model processes the sensor data to generate a low-dimensional numeric vector that represents semantic and visual characteristics of the item.

In a third step (Step 503), the item imbedding embedding is compared to stored item embedding, thereby identifying similar stored items. In some embodiments, the system compares the generated embedding to stored embeddings of items in available inventory using vector similarity computations such as cosine similarity or distance-based metrics.

In a fourth step (Step 504), one or more attributes of the similar stored items are associated with the item. Attributes associated with the similar stored items may be associated with the item based on the similarity between their embedding representations. Embeddings may encode semantic and descriptive attributes, including taxon, descriptive information, and pricing context.

Figure 15:
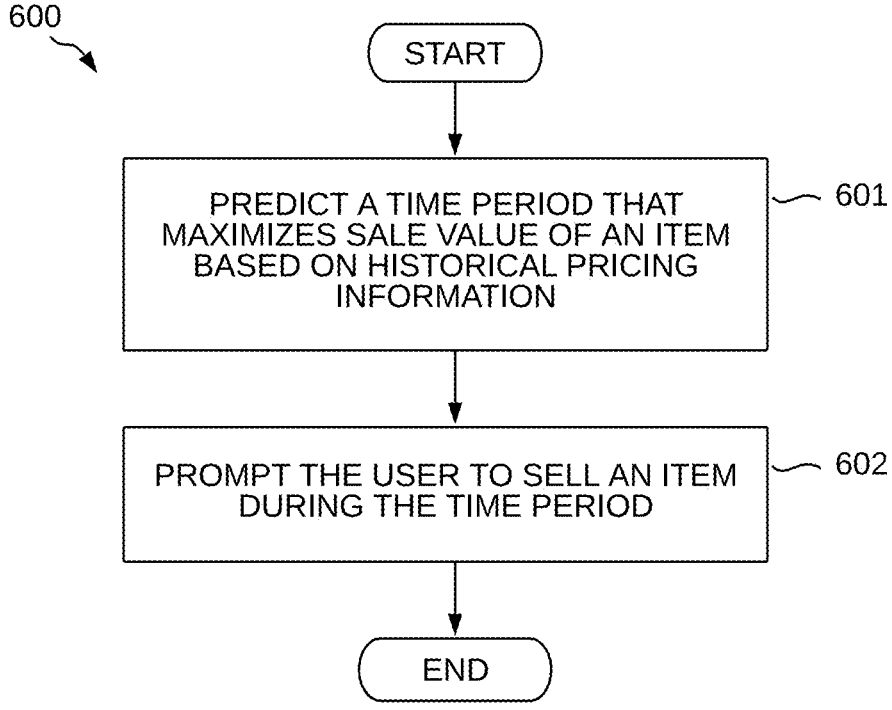
FIG. 15 shows a diagram of a method for prompting a user to sell an item during an optimal time period.

FIG. 15 shows a diagram of a method 600 for prompting a user to sell an item during an optimal time period. In one embodiment, method 600 is performed by the electronic commerce platform application server 12 running the digital closet application 21.

In a first step (Step 601), a time period that maximizes sale value of an item is predicted based on the historical pricing information 25.

In a second step (Step 602), the user is prompted to sell an item during the time period.

FIG. 16 shows a diagram of a method 700 illustrating operation of a sell-to-buy application in accordance with one embodiment. In one embodiment, method 700 is performed by the electronic commerce platform application server 12 running the sell-to-buy application 22.

In a first step (Step 701), user interest of inventory available on an electronic commerce platform is detected based on interaction between the user and the electronic commerce platform.

In a second step (Step 702), the trade-in value of one or more digital closet items stored in the digital closet of the user is predicted.

In a third step, the user is prompted to trade-in at least one of the one or more digital closet items thereby applying the trade-in value in purchase of the inventory.

Figure 17:
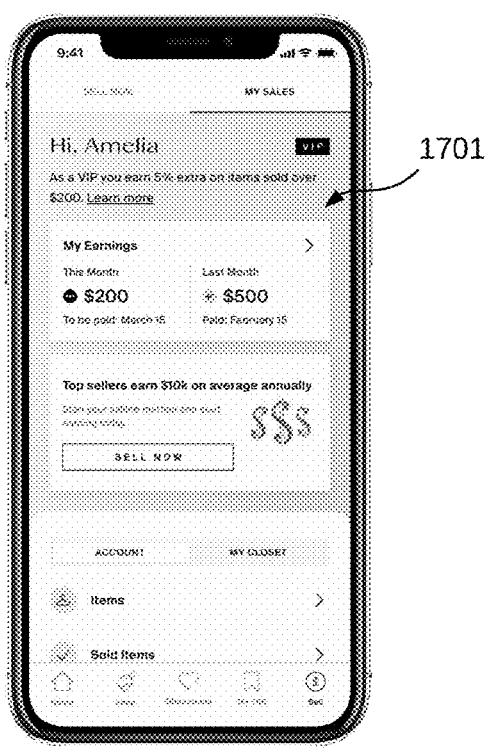

FIG. 17 is a diagram of a screenshot 1701 showing a user profile view available via the electronic commerce platform.

Figure 18:
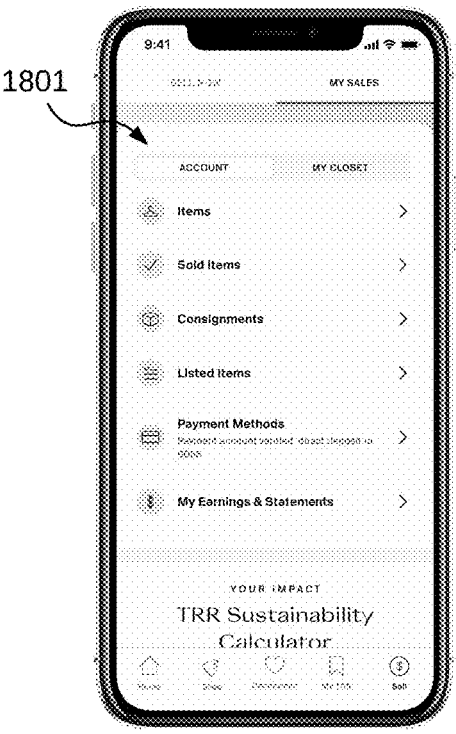

FIG. 18 is a diagram of a screenshot 1801 showing how the digital closet interface 1902 is accessed via the user profile view.

Figure 19:
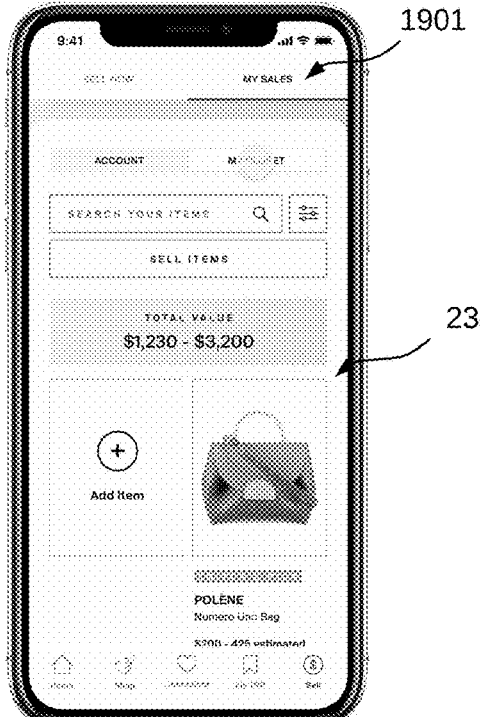

FIG. 19 is a diagram of a screenshot 1901 showing the digital closet interface 23. The user scrolls through the digital interface 23 to view and manage digital closet items.

Figure 20:
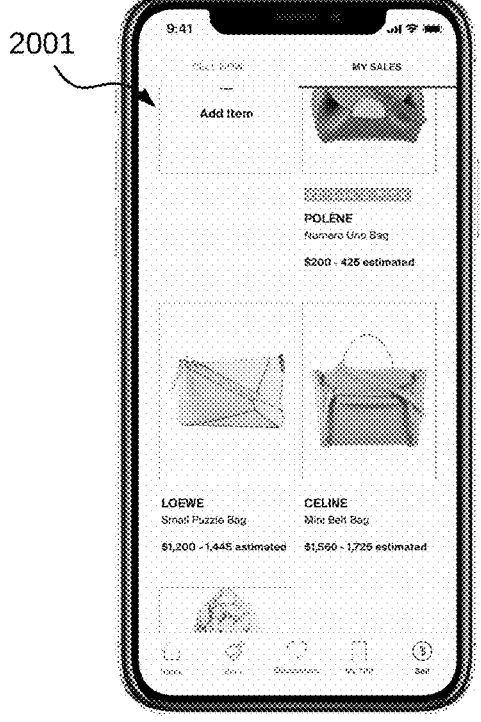

FIG. 20 is a diagram of a screenshot 2001 showing how the user scrolls through the digital closet interface 23 to see digital closet items.

Figure 21:
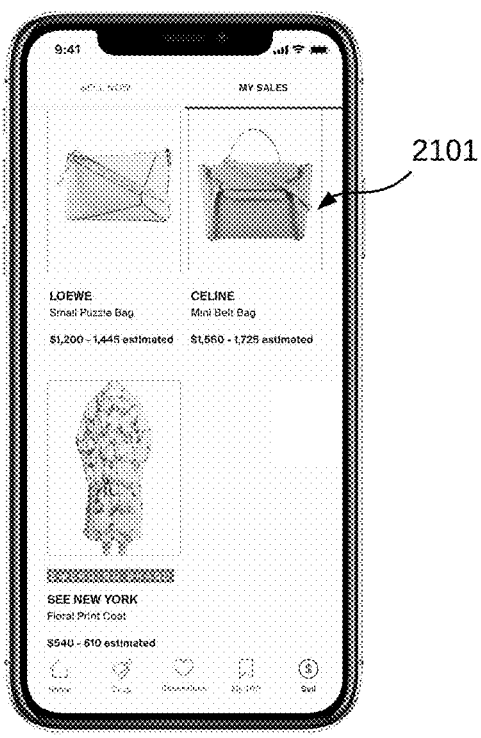

FIG. 21 is a diagram of a screenshot 2101 showing additional digital closet items available on the digital closet interface 23.

Figure 22:
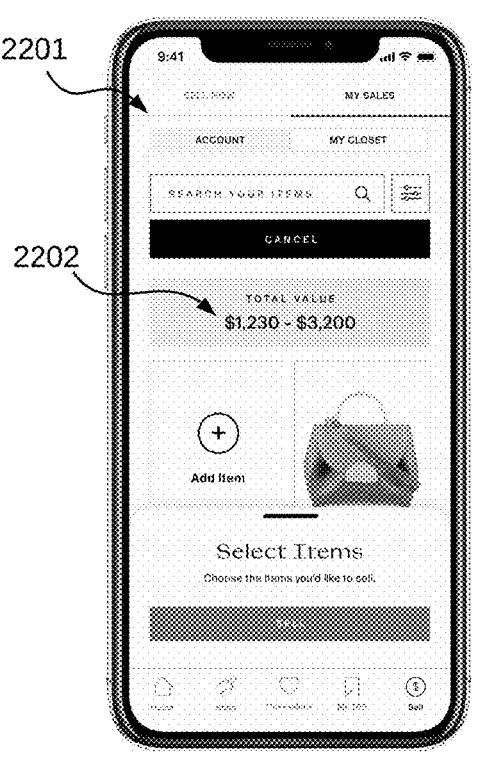

FIG. 22 is a diagram of a screenshot 2201 showing predicted aggregate sale value 2202 of all digital closet items. The predicted aggregate sale value 2202 is obtained by summing predicted sale values of each digital closet item.

Figure 23:
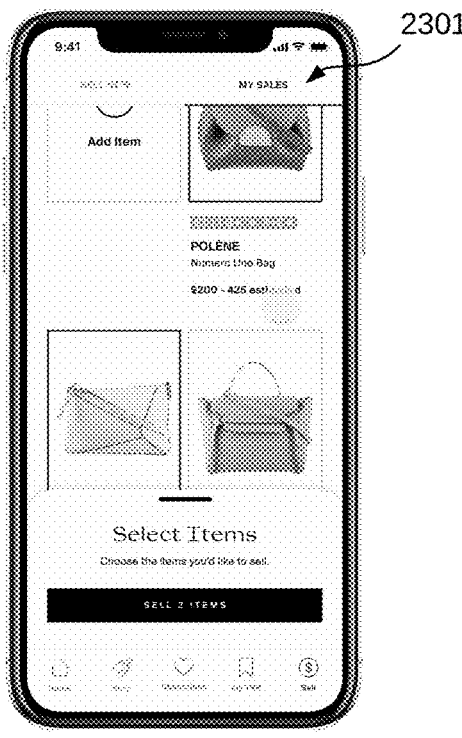

FIG. 23 is a diagram of a screenshot 2301 showing a user scrolling through the digital closet interface 23. In various embodiments, the digital closet interface 23 is available via mobile device, desktop applications, physical kiosks, personal assistants, and/or virtual reality headsets.

Figure 24:
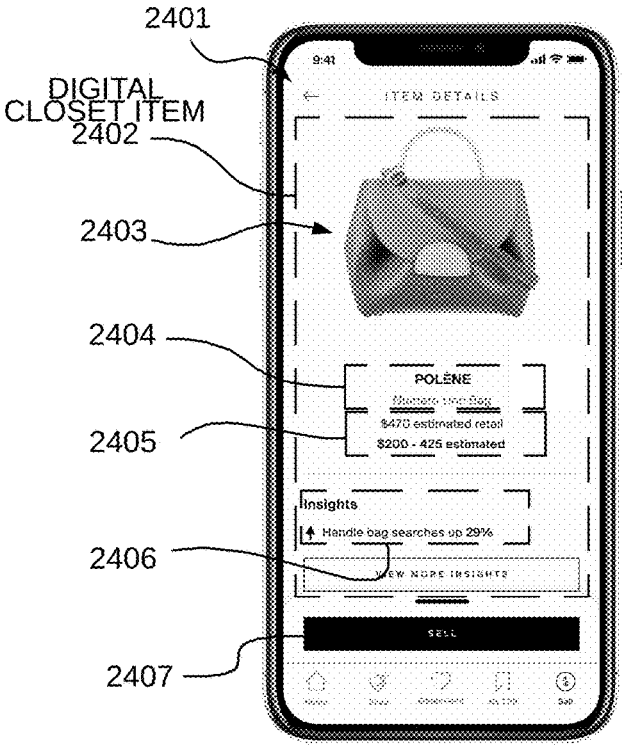

FIG. 24 is a diagram of a screenshot 2401 showing a digital closet item 2402. The digital closet item includes an image 2403, attributes 2404, such as brand and description ("POLÈNE Numero Uno bag"), and predicted sales price 2405 ("$200-$425"). A marketplace insight 2406 is also provided in connection with taxon of the digital closet item 2402 ("Handle bag searches up 29%"). Such marketplace insights provide utility to users as they attempt to maintain relevant wardrobes and seek to acquire items having high resale potential. A one-click sell button 2407 is provided allowing the user to instantly initiate a trade-in, consignment, or sale of the digital close item 2402.

FIG. 25 is a diagram of a screenshot 2501 showing an add digital closet item interface 2502. The add digital closet item interface 2502 allows the user to add new digital closet items to their digital closet. The add digital closet item interface 2502 includes a design information tab 2503, a detail tab 2504, and a confirmation tab 2505.

FIG. 26 is a diagram of a screenshot 2601 showing the designer tab 2503 of the add digital closet item interface 2502. The design tab 2503 allows the user to select a designer from a drop down menu 2602.

FIG. 27 is a diagram of a screenshot 2701 of the designer tab 2503 showing confirmation of the selected designer from a drop down menu 2602. In other embodiments, the machine learning system 19 automatically detects the designer, source, or brand of the item from an image and/or point cloud.

Figure 28:
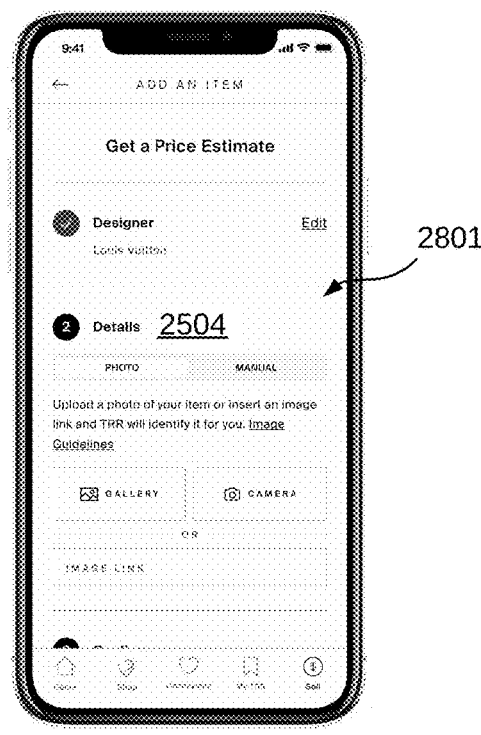

FIG. 28 is a diagram of a screenshot 2801 showing the details tab 2504 of the add digital closet item interface 2502. The details tab 2504 allows the user to upload sensor data for the item, such as image or point cloud information. In this example, the user obtains an image of the item to be added to the digital closet.

Figure 29:
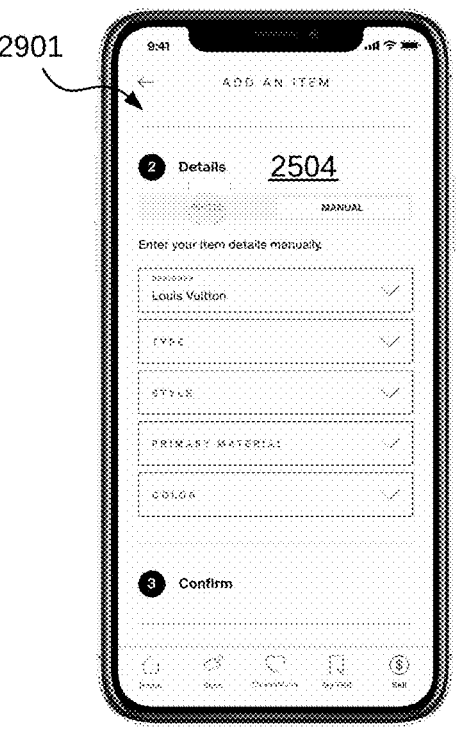

FIG. 29 is a diagram of a screenshot 2901 showing manual entry options of the details tab 2504. The details tab 2504 allows the user to manually enter information for a new digital closet item.

Figure 30:
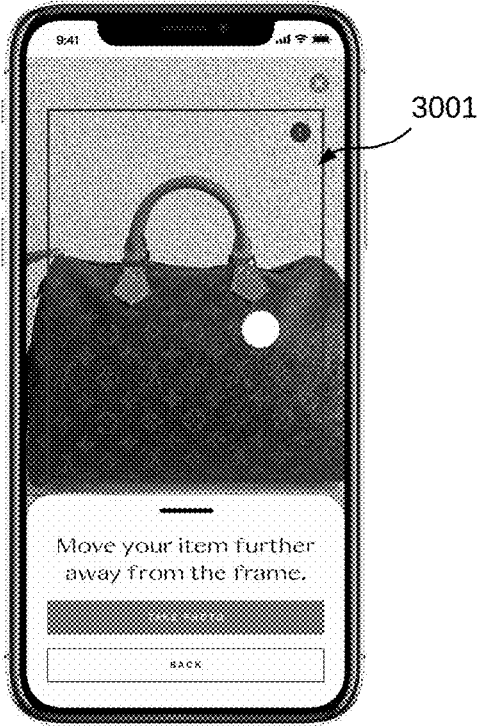

FIG. 30 is a diagram of a screenshot 3001 showing a guided photo capture view. The guided photo capture view ensures an appropriate image of the item is obtained that can be used to properly identify the item. For additional information on how to generate, render, and provide guided sensor data that ensures adequate images of items are obtained for purposes of machine learning analysis and processing, see: U.S. patent application Ser. No. 18/478,877, "Automated System Having Vertical And Horizontal Stacking Of Photo Studios For Efficient Image Capture," filed on Sep. 29, 2023, by Cheema et al. (the entire subject matter of the foregoing patent document is hereby expressly incorporated by reference).

Figure 31:
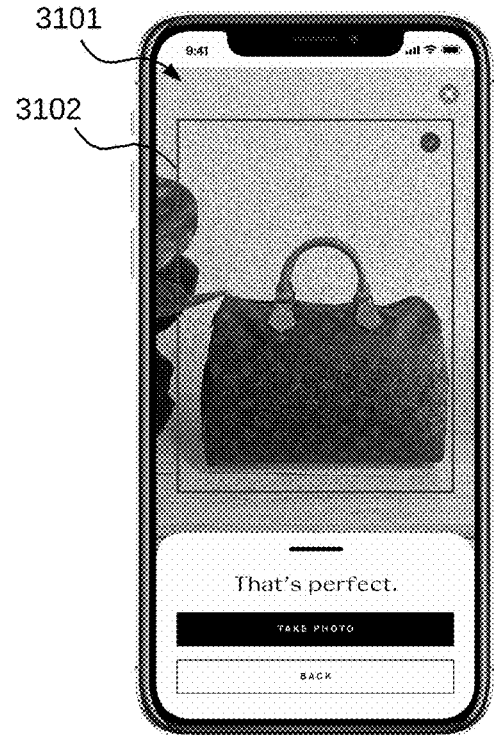

FIG. 31 is a diagram of a screenshot 3101 showing the guided photo capture view confirming the item is ready for image capture. In this example, the guided photo capture view provides feedback to the user via guide 3102 indicating that the item is correctly in focus and ready for sensor data capture.

In some embodiments, the system 10 performs active analysis of image data presented within the guided photo capture view to determine whether an item is properly positioned for capture in real time. As illustrated in FIGS. 30 and 31, the guided photo capture view displays a capture boundary region against which the system 10 evaluates the position of the item. In one example, the system 10 analyzes incoming image data to identify contours corresponding to the item, by determining that the item is the largest contour in the image and by finding a bounding box of the largest contour to determine the item's position, alignment, and orientation within the field of view.

In some embodiments, the system 10 processes depth data received from the device, including remote-sensing data, where the depth data includes three-dimensional point-cloud representations of the item. The depth data may be preprocessed using techniques that remove noise from the point cloud and segment the point cloud into meaningful parts.

The guided photo capture view or guided capture interface may present real-time guidance cues generated by the system 10 to assist the user in repositioning the item when the capture-quality criteria are not satisfied. For example, FIG. 30 shows a condition in which the item falls outside the acceptable capture boundary region, and the guided photo capture view presents on-screen guidance instructing the user to adjust the item. FIG. 31 shows a condition in which the item satisfies the capture-quality criteria and the guided photo capture view presents confirmation guidance indicating that the item is properly positioned for capture.

In some embodiments, the system 10 provides guidance to the user for orienting and aligning the item for appropriate image capture. The interface may present messages or visual indicators instructing the user to position the item within a guide boundary. If the system determines that the item is not properly aligned, it may alert the user and request adjustment. When the item satisfies the alignment or other capture-quality criteria, the system 10 enables a capture control, such as presenting a capture button. This allows capture only when the item has been verified to satisfy the evaluated criteria and reduces the need for recapture or computationally intensive post-processing.

FIG. 32 is a diagram of a screenshot 3201 of the details tab 2504 showing confirmation of the captured image 3202.

FIG. 33 is a diagram of a screenshot 3301 of the confirmation tab 2505 that allows the user to select the most similar item.

FIG. 34 is a diagram of a screenshot 3401 of the user scrolling through the confirmation tab 2505 to identify the most similar item.

FIG. 35 is a diagram of a screenshot 3501 of the user selecting and/or confirming predicted attributes of the item. Attributes include source or designer, taxon or type, style, material information, and other attributes that describe the item.

Figure 36:
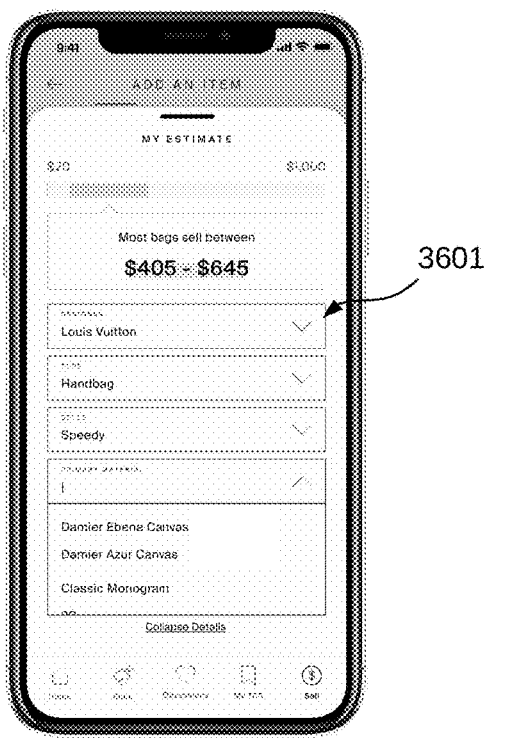

FIG. 36 is a diagram of a screenshot 3601 of the user updating the material prediction. In this example, the attribute information is updated based on user input.

Figure 37:
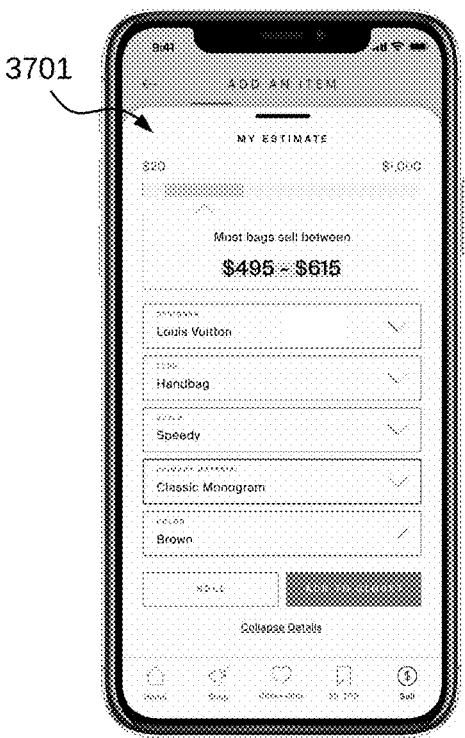

FIG. 37 is a diagram of a screenshot 3701 showing the user confirming attribute information and adding the digital closet item to their digital closet.

Figure 38:
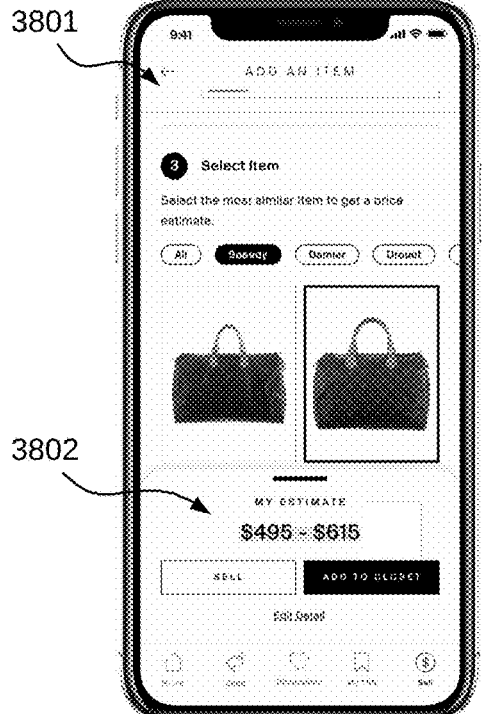

FIG. 38 is a diagram of a screenshot 3801 showing the predicted sale price 3802 presented to the user.

Figure 39:
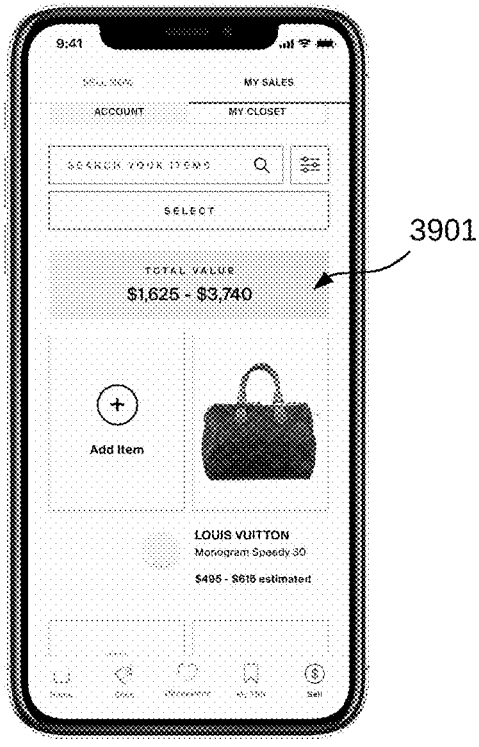

FIG. 39 is a diagram of a screenshot 3901 showing an updated predicted aggregate sale value of all closet items in the user's digital closet. The digital closet interface is dynamically updated to account for the newly added digital closet items.

Figure 40:
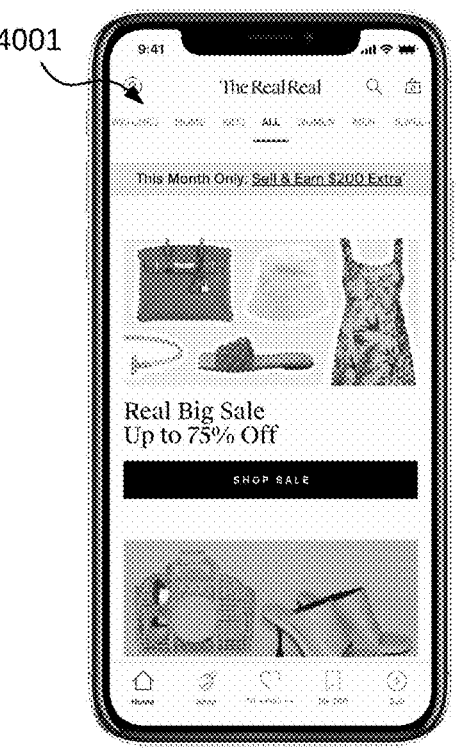

FIG. 40 is a diagram of a screenshot 4001 showing a user viewing items available on the electronic commerce platform.

Figure 41:

FIG. 41 is a diagram of a screenshot 4101 showing a user viewing a product detail page (PDP) for an item.

Figure 42:

FIG. 42 is a diagram of a screenshot 4201 showing a user adding an item on the electronic commerce platform to their digital closet. In accordance with another novel aspect, the user is able to add items to their digital closet while shopping for items on the electronic commerce platform. If the user identifies an item already in their possession while viewing items on the platform, then the user is able to add such items to their digital closet via user input 4202.

Figure 43:
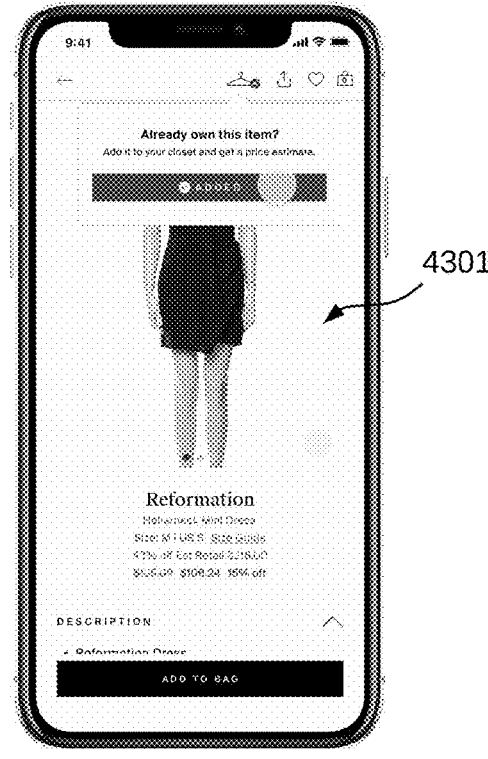

FIG. 43 is a diagram of a screenshot 4301 showing confirmation of the digital closet item added during the user navigating PDPs provided via the electronic commerce platform.

Figure 44:
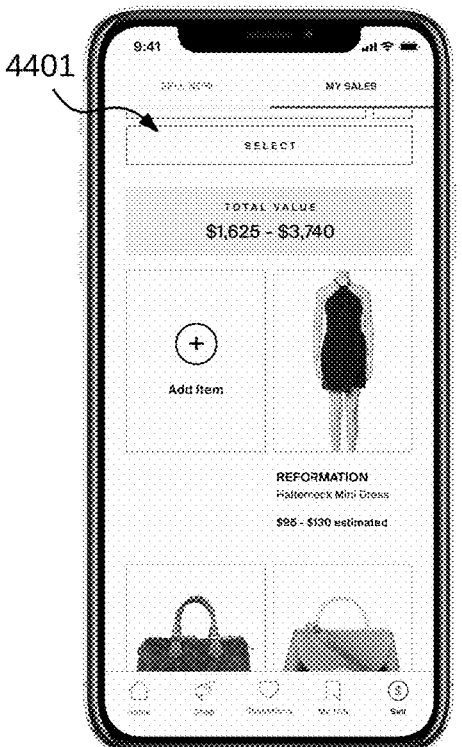

FIG. 44 is a diagram of a screenshot 4401 showing an updated predicted aggregate sale value of all closet items in the user's digital closet. The digital closet interface is dynamically updated to account for the newly added digital closet items.

Although certain specific embodiments are described above for instructional purposes, the teachings of this patent document have general applicability and are not limited to the specific embodiments described above. The server applications 18 and the storage system 20 are implemented using Google® Cloud Platform (GCP), Amazon® Web Services (AWS), or Microsoft® Azure cloud services, but it is appreciated that the server applications 18 and the storage system 20 may be implemented in many other ways using other platforms or techniques. Accordingly, various modifications, adaptations, and combinations of various features of the described embodiments can be practiced without departing from the scope of the invention as set forth in the claims.

What is claimed is:

1. A method comprising:

receiving, by a digital closet application, sensor data of an item from a device of a user via a guided capture interface, wherein the sensor data comprises image data of the item;

controlling, by the digital closet application, a capture function of the guided capture interface by:

analyzing, in real time, the image data to determine a position and orientation of the item relative to a guide boundary depicted within the guided capture interface;

in response to detecting that the position and orientation of the item is not aligned within the guide boundary, generating real-time guidance cues in the guided capture interface that prompt the user to reposition the item, wherein the capture function remains disabled while the position and orientation is not aligned; and in response to detecting the position and orientation is aligned within the guide boundary, enabling the capture function by causing a capture button to be displayed within the guided capture interface; and, capturing the image data of the item aligned within the guide boundary in response to selection of the capture button;

identifying the item from the captured image data of the item using a machine learning system;

predicting sale value information of the item based on historical pricing information of an electronic commerce platform;

storing a digital closet item associated with the user, wherein the digital closet item is a digital representation of the item and includes the predicted sale value information;

providing a digital closet interface that dynamically presents one or more digital closet items of the user on the device, wherein the digital closet interface presents marketplace insights to the user;

detecting user interest of inventory available on the electronic commerce platform based on clickstream data indicating interaction between the user and the electronic commerce platform:

predicting trade-in value of one or more digital closet items stored in a digital closet of the user based on the historical pricing information of the electronic commerce platform; and prompting the user to trade-in the one or more digital closet items based on the trade-in value.

2. The method of claim 1, wherein the item is predicted from the sensor data using one or more neural networks of the machine learning system.

3. The method of claim 1, further comprising:

predicting attribute information of the item based on stored item information of an electronic commerce platform.

4. The method of claim 3, wherein the predicting of the attribute information comprises:

generating an item embedding from the sensor data;

comparing the item embedding to stored item embeddings thereby identifying similar stored items; and associating one or more attributes of similar stored items to the item.

5. The method of claim 4, wherein the predicting of the attribute information further comprises:

updating the attribute information of the item based on user input.

6. The method of claim 1, further comprising:

predicting a time period that maximizes sale value of a digital closet item based on historical pricing information; and prompting the user to sell the digital closet item during the time period.

7. The method of claim 6, wherein the time period that maximizes sale value of the digital closet item is predicted also based on an upcoming event or user input.

8. The method of claim 1, wherein the device is selected from a group consisting of: a mobile device, a tablet, a desktop computer, a VR/AR headset, a virtual assistant device, or a device operable to communicate over a network.

9. A system comprising:

a storage system; and a processor configured to execute a digital closet application, wherein the digital closet application is configured to:

receive sensor data of an item from a device of a user, the sensor data comprising image data of the item;

control a capture function of a guided capture interface by:

analyzing the image data to determine a position and orientation of the item relative to a guide boundary depicted within the guided capture interface;

in response to detecting that the position and orientation of the item is not aligned within the guide boundary, generating real-time guidance cues in the guided capture interface that prompt the user to reposition the item, wherein the capture function remains disabled while the position and orientation is not aligned; and in response to detecting the position and orientation is aligned within the guide boundary, enabling the capture function by causing a capture button to be displayed within the guided capture interface; and, capturing the image data of the item aligned within the guide boundary in response to selection of the capture button;

identify the item from the captured image data of the item;

store a digital closet item associated with the user that is a digital representation of the item;

predict sale value information of the item based on historical pricing information;

provide a digital closet interface, wherein the digital closet interface dynamically presents one or more digital closet items of the user on the device;

detect user interest of inventory available on an electronic commerce platform based on clickstream data indicating interaction between the user and the electronic commerce platform;

predict trade-in value of one or more digital closet items stored in a digital closet of the user based on the historical pricing information; and prompt the user to trade-in the one or more digital closet items based on the trade-in value in purchase of the inventory.

10. The system of claim 9, wherein the digital closet application uses a machine learning system to identify the item from the sensor data.

11. The system of claim 9, wherein the digital closet application is also configured to predict attribute information of the item based on stored item information in the storage system.

12. The system of claim 11, wherein the digital closet application predicts attribute information of the item by:

generating an item embedding from the sensor data;

comparing the item embedding to stored item embeddings in the storage system thereby identifying similar stored items; and associating one or more attributes of similar stored items to the item.

13. The system of claim 12, wherein the digital closet application is also configured to:

update the attribute information of the item based on user input.

14. The system of claim 9, wherein the digital closet application is also configured to:

predict a time period that maximizes sale value of a digital closet item based on historical pricing information; and prompt the user to sell the digital closet item during the time period.

15. A system comprising:

memory; and a means for:

receiving sensor data of an item from a device of a user, the sensor data comprising image data of the item;

controlling a capture function of a guided capture interface by:

analyzing the image data to determine a position and orientation of the item relative to a guide boundary depicted within the guided capture interface;

in response to detecting that the position and orientation of the item is not aligned within the guide boundary, generating real-time guidance cues in the guided capture interface that prompt the user to reposition the item, wherein the capture function remains disabled while the position and orientation is not aligned; and in response to detecting the position and orientation is aligned within the guide boundary, enabling the capture function by causing a capture button to be displayed within the guided capture interface; and, capturing the image data of the item aligned within the guide boundary in response to selection of the capture button;

identifying the item from the captured image data of the item;

predicting sale value information of the item based on historical pricing information of an electronic commerce platform;

storing a digital closet item associated with the user that is a digital representation of the item, providing a digital closet interface, wherein the digital closet interface dynamically presents one or more digital closet items of the user on the device;

detecting user interest of inventory available on the electronic commerce platform based on clickstream data indicating interaction between the user and the electronic commerce platform:

predicting trade-in value of one or more digital closet items stored in a digital closet of the user based on the historical pricing information of the electronic commerce platform; and prompting the user to trade-in the one or more digital closet items based on the trade-in value in purchase of the inventory.

16. The system of claim 15, wherein the means is a digital closet application operating on a computing instance provided via a cloud computing platform.

* * * * *